United States Patent
Thor et al.

(10) Patent No.: US 11,563,624 B2
(45) Date of Patent: Jan. 24, 2023

(54) FAULT DETECTION AND ISOLATION SYSTEM FOR VEHICLES

(71) Applicant: Woven Planet North America, Inc., Los Altos, CA (US)

(72) Inventors: Mikael Kjell Anders Thor, Sunnyvale, CA (US); Palak Talwar, San Jose, CA (US); Francis Everett Fearon, San Francisco, CA (US); Hans-Peter Loeb, Menlo Park, CA (US); Pedro Oscar Varangot, San Francisco, CA (US); Glen Alan Sapilewski, Redwood City, CA (US)

(73) Assignee: Woven Planet North America, Inc., Los Altos, CA (US)

( * ) Notice: Subject to any disclaimer, the term of this patent is extended or adjusted under 35 U.S.C. 154(b) by 36 days.

(21) Appl. No.: 17/133,302

(22) Filed: Dec. 23, 2020

(65) Prior Publication Data
US 2022/0200843 A1 Jun. 23, 2022

(51) Int. Cl.
*H04L 41/0659* (2022.01)
*H04L 12/40* (2006.01)

(52) U.S. Cl.
CPC .... *H04L 41/0659* (2013.01); *H04L 12/40169* (2013.01); *H04L 2012/40215* (2013.01); *H04L 2012/40273* (2013.01)

(58) Field of Classification Search
CPC ........... H04L 41/0659; H04L 12/40169; H04L 2012/40215; H04L 2012/40273; H04L 9/3236; H04L 9/3263; H04L 67/12; H04L 9/3247; H04W 4/38; G05D 1/0246; G05D 1/0061; B60W 50/0205
See application file for complete search history.

(56) References Cited

U.S. PATENT DOCUMENTS

2019/0324450 A1* 10/2019 Lurie .................... H04L 9/3236
2019/0324454 A1* 10/2019 Hansel .................. B60W 40/10
2020/0406907 A1* 12/2020 Omari .................... G07C 5/008

* cited by examiner

*Primary Examiner* — Oussama Roudani
(74) *Attorney, Agent, or Firm* — Christopher G. Darrow; Darrow Mustafa PC

(57) ABSTRACT

A method includes determining vehicle driving parameters associated with a driving behavior of a vehicle while in an autonomous driving mode. A plurality of electronic control units (ECUs) is interconnected to a vehicle bus for communicating instructions from electromechanical contacts to actuators to control the driving behavior. The computing unit may receive a control signal from one of the ECUs. The computing unit lacks knowledge of whether the control signal a valid. The method further includes analyzing vehicle driving parameters associated with the driving behavior to determine whether the vehicle driving parameters satisfy a driving behavior criteria. Subsequent to determining that the vehicle driving parameters fails to satisfy the driving behavior criteria, the method includes generating a signal that causes the electromechanical contacts to disconnect from the vehicle bus and disable communication of instructions between the ECUs and the vehicle bus.

20 Claims, 9 Drawing Sheets

FAULT DETECTION AND ISOLATION SYSTEM FOR VEHICLES

TECHNICAL FIELD

This disclosure relates generally to a system for autonomous or semi-autonomous vehicles, and, more specifically, to a fault detection and isolation system for autonomous or semi-autonomous vehicles.

BACKGROUND

Autonomous or semi-autonomous vehicles may allow for the function of a human driver to be supplemented or completely replaced by one or more computer-based driving systems. In some instances, to facilitate communication across the various systems and subsystems that may comprise an autonomous or semi-autonomous vehicle, the vehicle may include a controller area network (CAN) bus. The CAN bus may include a secure communications bus for interconnecting a number of motion control actuator electronic control units (ECUs) to share information between each other and/or with one or more other components that may be interconnected to the CAN bus. Specifically, the number of motion control actuator ECUs may be utilized to control one or more respective actions or functions of the vehicle in accordance with the automotive safety regulations and the traffic laws of the jurisdiction in which the vehicle is operating. For example, in some instances, prior to being able to perform necessary prototype testing of a vehicle being trained and developed, each of the motion control actuator ECUs may be subject to passing rigorous and stringent functional safety and regulatory certifications. It may be useful to provide techniques to better chaperone and manage motion control actuator ECUs during prototype testing and otherwise.

DESCRIPTION OF EXAMPLE EMBODIMENTS

Figure 1:
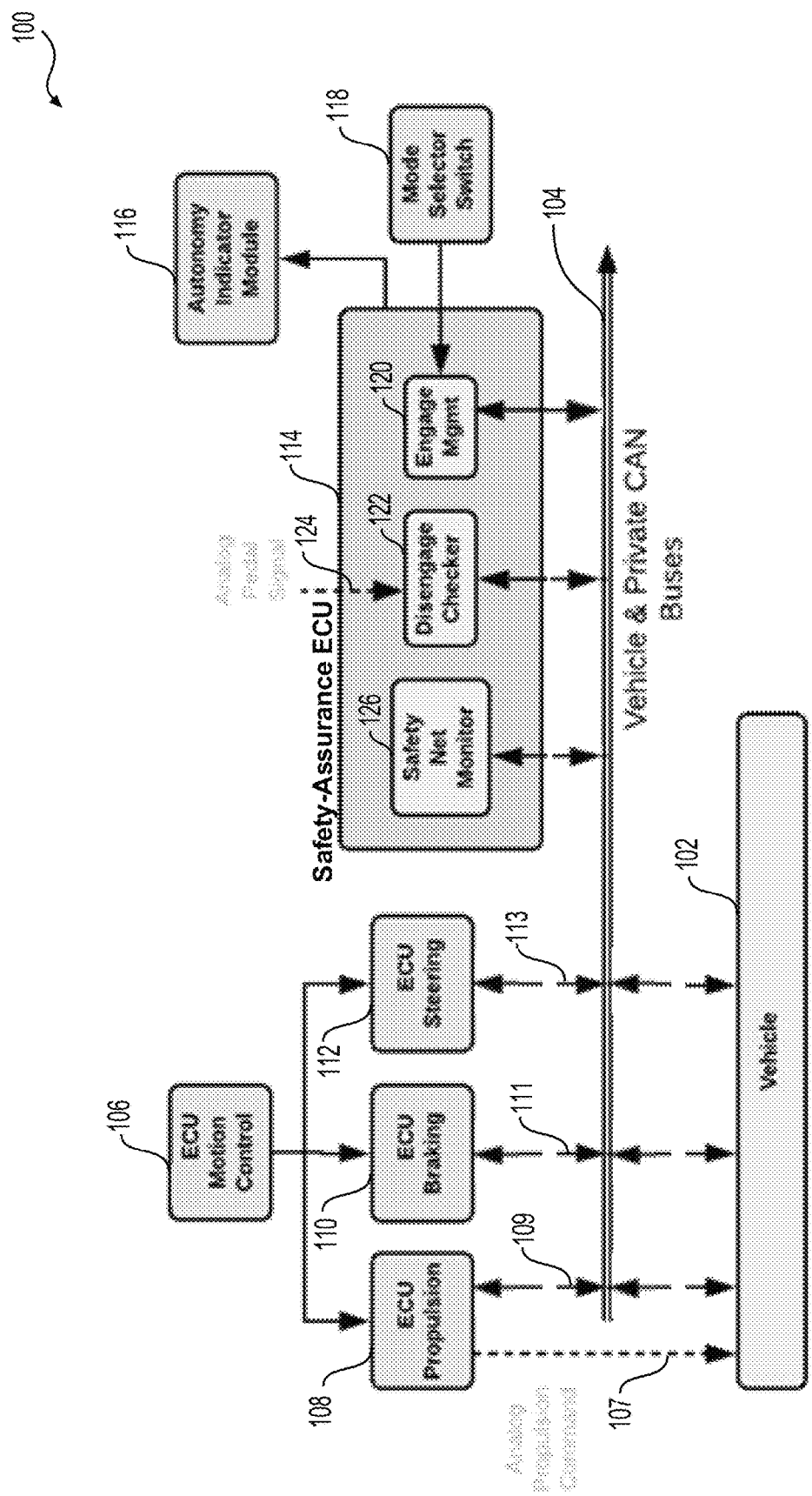
FIG. 1 illustrates an example vehicle controller area network (CAN) bus system.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described. In addition, the embodiments disclosed herein are only examples, and the scope of this disclosure is not limited to them. Certain embodiments may include all, some, or none of the components, elements, features, functions, operations, or steps of the embodiments disclosed above. Embodiments according to the invention are in particular disclosed in the attached claims directed to a method, a storage medium, a system and a computer program product, wherein any feature mentioned in one claim category, e.g., method, may be claimed in another claim category, e.g., system, as well. The dependencies or references back in the attached claims are chosen for formal reasons only. However, any subject matter resulting from a deliberate reference back to any previous claims (in particular multiple dependencies) may be claimed as well, so that any combination of claims and the features thereof are disclosed and may be claimed regardless of the dependencies chosen in the attached claims. The subject-matter which may be claimed comprises not only the combinations of features as set out in the attached claims but also any other combination of features in the claims, wherein each feature mentioned in the claims may be combined with any other feature or combination of other features in the claims. Furthermore, any of the embodiments and features described or depicted herein may be claimed in a separate claim and/or in any combination with any embodiment or feature described or depicted herein or with any of the features of the attached claims.

Autonomous or semi-autonomous vehicles may allow for the function of a human driver to be supplemented or completely replaced by one or more computer-based driving systems. In some instances, to facilitate communication across the various systems and subsystems that may comprise an autonomous or semi-autonomous vehicle, the vehicle may include a controller area network (CAN) bus. The CAN bus may include a secure communications bus for interconnecting a number of motion control actuator electronic control units (ECUs) to share information between each other and/or with one or more other components that may be interconnected to the CAN bus. Specifically, the number of motion control actuator ECUs may be utilized to control one or more respective actions or functions of the vehicle in accordance with the automotive safety regulations and the traffic laws of the jurisdiction in which the vehicle is operating. For example, in some instances, prior to being able to perform necessary prototype testing of a vehicle being trained and developed, each of the motion control actuator ECUs may be subject to passing rigorous and stringent functional safety and regulatory certifications.

In certain embodiments, the safety assurance ECU may be interconnected to the CAN bus, and may be provided to monitor and chaperone the motion control actuator ECUs (e.g., which may not be functionally and regulatorily certified), for example, during prototype testing. For example, during prototype testing, the safety assurance ECU may perform functions, such as monitoring for autonomous-driving mode disengagements, monitoring thresholds for vehicle driving parameters (e.g., lateral acceleration, acceleration, velocity, steering angle, braking, throttle position, and so forth) correspondent to commands being sent from the motion control actuator ECUs, monitoring for system faults that may occur with respect to the motion control actuator ECUs or one or more other subsystems of the vehicle, and so forth. Specifically, in response to detecting a fault or other disturbance deemed as being potentially unsafe, the safety assurance ECU may perform an action to isolate the fault by, for example, disengaging one or more of the motion control actuator ECUs. However, because the motion control actuator ECUs may not be functionally and regulatorily certified with respect to necessary functional safety and regulatory certifications, there may be no way for the safety assurance ECU to trust the source of the fault, to trust the efficacy of any software-based CAN messages, fault codes, or other commands that may be provided by one or more of the motion control actuator ECUs (e.g., which may possibly be incorrectly computed due to errors elsewhere in the autonomy stack), or to trust that any of the motion control actuator ECUs will be responsive to messages or commands provided by the safety assurance ECU. To increase overall vehicle safety and prototyping flexibility, it may be useful to provide one or more hardware-based CAN bus fault detection and isolation techniques.

Accordingly, the present embodiments are directed to a safety assurance ECU for monitoring autonomous or semi-autonomous vehicle driving behavior and performing a hardware-based action (e.g., providing a logic signal to trip hardware contacts) to disable communication from one or more of the motion control actuator ECUs to the CAN bus in response to a detected fault or other disturbance deemed as being potentially unsafe. For example, in certain instances, a vehicle may include a safety assurance ECU, which may be interconnected in parallel via the CAN bus to a propulsion motion control actuator ECU, a steering motion control actuator ECU, and a braking motion control actuator ECU. The safety assurance ECU may constantly monitor vehicle driving behavior based on one or more criteria (e.g., lateral acceleration threshold, acceleration threshold, velocity threshold, steering angle threshold, braking threshold, throttle position threshold, jerk threshold, comfortability threshold, ride smoothness threshold, and so forth) to detect fault conditions (e.g., a vehicle driving behavior was not in accordance with the command or CAN messages provided by the motion control actuator ECUs, or the vehicle is behaving in accordance with faulty commands). In response to detecting a fault, the safety assurance ECU may generate and provide one or more silencing signals (e.g., logic signals) to trip hardware contacts utilized to disable communication from one or more of the propulsion motion control actuator ECU, the steering motion control actuator ECU, and the braking motion control actuator ECU to the CAN bus.

For example, the one or more silencing signals (e.g., logic signals) may trip one or more hardware contacts (e.g., electromechanical contacts, electrohydraulic contacts, piezoelectric contacts, and so forth), which may disable communication to the CAN bus, and, by extension, force the motion control actuator ECUs to be unable to send commands to the vehicle. Specifically, for the braking motion control actuator ECU and the steering motion control actuator ECU, the one or more silencing signals (e.g., logic signals) may prevent the braking motion control actuator ECU and/or the steering motion control actuator ECU from being able to send commands through the CAN bus. Yet, for the propulsion motion control actuator ECU, in particular, the one or more silencing signals (e.g., logic signals) may trip one or more hardware contacts (e.g., electromechanical contacts, electrohydraulic contacts, piezoelectric contacts, and so forth), which may either disable CAN message or command transmission on the CAN bus from the propulsion motion control actuator ECU or cause an accelerator to switch into a disengagement-driving mode. Subsequent to the disabling of the CAN messages or commands of the motion control actuator ECUs, the safety assurance ECU may relinquish vehicle driving control to a supervisory driver, or otherwise cause the vehicle to perform a hazard state driving maneuver (e.g., perform a gradual braking before coming to a safe stop).

Indeed, in certain embodiments, the safety assurance computing unit may be in serial communication with a number of motion control actuator ECUs of a vehicle. In certain embodiments, the safety assurance ECU may determine one or more vehicle driving parameters associated with a driving behavior of the vehicle while the vehicle is engaged in an autonomous driving mode. For example, in one embodiment, each of the motion control actuator ECUs may be interconnected to a CAN vehicle bus for communicating instructions from one or more electromechanical contacts to one or more actuators of the vehicle to control the driving behavior. In certain embodiments, the safety assurance computing unit may receive a control signal from one or more of the motion control actuator ECUs. In one embodiment, the computing unit may lack any indication of whether the control signal is a valid signal. In certain embodiments, the safety assurance computing unit may then analyze the one or more vehicle driving parameters associated with the driving behavior to determine whether the one or more vehicle driving parameters satisfies a driving behavior criteria to compensate for the safety assurance computing unit not knowing whether the control signal is a valid signal.

For example, in certain embodiments, the driving behavior criteria may include, for example, one or more of a predetermined velocity threshold, a predetermined steering angle threshold, a predetermined acceleration threshold, a predetermined lateral acceleration threshold, a predetermined positioning threshold, a predetermined throttle position threshold, a predetermined torque threshold, a predetermined jerk threshold, a predetermined fuel range threshold, a predetermined charge range threshold, a predetermined clutch engagement threshold, or a predetermined air-to-fuel ratio threshold. In certain embodiments, in response to determining that the one or more vehicle driving parameters fails to satisfy the driving behavior criteria, the safety assurance computing unit may then generate a signal that causes the electromechanical contacts to disconnect from the vehicle bus and disable communication of instructions between one or more of the motion control actuator ECUs and the vehicle CAN bus and instruct the vehicle to switch from the autonomous-driving mode to a disengagement-mode. For example, in one embodiment, the safety assurance computing unit may generate the signal that causes the electromechanical contacts to disconnect from the vehicle CAN bus by determining whether the signal and a second signal include logical high values. For example, the second signal may correspond to an indication that the vehicle is operating in the autonomous-driving mode.

For example, in one embodiment, in response to determining that the one or more vehicle driving parameters fails to satisfy the driving behavior criteria, the safety assurance computing unit may generate a silencing signal that causes the electromechanical contacts to disconnect from the vehicle CAN bus and disable communication of instructions between a braking motion control actuator ECU computing unit of the number of motion control actuator ECUs and a transceiver of the braking motion control actuator ECU utilized to enable the communication of instructions to the vehicle CAN bus in the autonomous-driving mode. In another embodiment, in response to determining that the one or more vehicle driving parameters fails to satisfy the driving behavior criteria, the safety assurance computing unit may generate a silencing signal that causes the electromechanical contacts to disconnect from the vehicle CAN bus and disable communication of instructions between a steering motion control actuator ECU of the number of motion control actuator ECUs and a transceiver of the steering motion control actuator ECU utilized to enable the communication of instructions to the vehicle CAN bus in the autonomous-driving mode.

Yet in another embodiment, in response to determining that the one or more vehicle driving parameters fails to satisfy the driving behavior criteria, the safety assurance computing unit may generate a silencing signal that causes the electromechanical contacts to disconnect from the vehicle CAN bus and disable communication of instructions between a propulsion motion control actuator ECU of the number of motion control actuator ECUs and a throttle output channel of the propulsion motion control actuator ECU utilized to enable the communication of instructions to the vehicle CAN bus in the autonomous-driving mode. In other embodiments, generating the silencing signal that causes the electromechanical contacts to disconnect from the vehicle CAN bus may include generating a signal that causes one or more other electromechanical contacts to enable communication of instructions between the propulsion motion control actuator ECU and a manual pedal input channel of the propulsion motion control actuator ECU utilized to enable control of the driving behavior of the vehicle in the disengagement-mode. In this way, the present techniques may provide a safety assurance ECU with functional safety and regulatory certification that may detect faults based on vehicle driving behavior and respond to the detected faults based entirely on the hardware interconnections of motion control actuator ECUs to the CAN bus. These techniques may thus increase overall vehicle safety and prototyping flexibility.

Thus, the present techniques may provide a safety assurance ECU that may be functionally and regulatorily certified that may detect faults based on vehicle driving behavior and respond to the detected faults based entirely on the hardware interconnections of the motion control actuator ECUs to the CAN bus. These techniques may thus increase overall vehicle safety and prototyping flexibility. Indeed, because the safety assurance ECU may ascertain the driving behavior of the vehicle based on one or more vehicle driving parameters (e.g., one or more of vehicle velocity, vehicle steering angle, vehicle acceleration, vehicle lateral acceleration, vehicle positioning parameter, vehicle throttle position, vehicle torque, vehicle jerk, vehicle fuel range, vehicle charge range, vehicle clutch engagement and/or disengagement, vehicle air-to-fuel ratio, vehicle altitude, vehicle passenger comfortability, vehicle ride smoothness, and so forth), the safety assurance ECU may not rely upon any software-based CAN messages, fault codes, or other commands that may be provided by one or more of the motion control actuator ECUs (e.g., which may possibly be incorrectly computed due to errors elsewhere in the autonomy stack), or that any of the motion control actuator ECUs will be responsive to messages or commands provided by the safety assurance ECU. This may thus allow the safety assurance ECU to achieve faster response times with respect to detecting, isolating, and protecting against vehicle driving behavior faults. Additionally, the one or more vehicle driving parameters may themselves be less susceptible to misinterpretation, distortion, extended processing times, and overloading as opposed to more complex software-based CAN messages and fault codes.

Indeed, utilizing the presently disclosed hardware-based actions (e.g., providing a logic signal to trip hardware, electromechanical contacts to disable communication from one or more of the motion control actuator ECUs to the CAN bus) avoids having to partition any single motion control actuator ECU into several partitions or segmentations, as may otherwise be suitable utilizing software-based CAN messages, fault codes, or other commands. For example, in some instances, one or more of the motion control actuator ECUs may include different levels of memory protection (e.g., segmentation memory protection, paged virtual memory protection, memory protection keys, simulated segmentation memory protection, and so forth), and therefore the hardware-based fault protection techniques as described herein may ensure that the lower integrity partitions or segmentations of memory protection may not adversely impact the memory protection of the higher integrity partitions or segmentations. Moreover, by relying solely upon the safety assurance ECU and the one or more vehicle driving parameters, any possibility of discrepancy between the safety assurance ECU and the one or more other motion control actuator ECUs may be minimized, in that the safety assurance ECU may take precedence over the motion control actuator ECUs with respect to vehicle driving behavior faults.

For example, in some embodiments, the motion control actuator ECUs and the safety assurance ECU may be developed and/or manufactured separately from each other (e.g., different manufacturers, different verification process, different models, and so forth), and thus the present techniques may allow for ECUs otherwise potentially incompatible to be paired together into a safety mechanism for developing vehicles. In other words, the safety assurance ECU may compensate for the lack of knowledge of efficacy with respect to the motion control actuator ECUs, thus allowing faster scaling and testing, for example, of an entire fleet of vehicles without any concern that the vehicles may be susceptible to any potential collisions or other precarious events. Indeed, the present embodiments of providing the safety assurance ECU that may be functionally and regulatorily certified that may detect faults based on vehicle driving behavior and respond to the detected faults based entirely on the hardware interconnections of the motion control actuator ECUs to the CAN bus may compensate for the possibility that the motion control actuator ECUs may include limited memory resources and/or may include components or software still under development and testing, and thus cannot be reasonably relied upon to operate in accordance with the desired functionality in the event of one or more fault-based conditions. Lastly, by providing the safety assurance ECU that may be functionally and regulatorily certified that may detect faults based on vehicle driving behavior and respond to the detected faults based entirely on the hardware interconnections of the motion control actuator ECUs to the CAN bus may enhance flexibility with respect to the management and adherence to many functional safety requirements (FSR) through only a single physical element (e.g., the safety assurance ECU). Such a configuration may limit physical interface complexities, ensure greater hardware reliability, and distinguish critical safety functions from non-safety critical functions.

With the forgoing in mind, it may be useful to describe an example vehicle controller area network (CAN) bus system 100, as illustrated, for example, by FIG. 1. In certain embodiments, the vehicle CAN bus system 100 may include, for example, a secure communications bus 104 for interconnecting a number of motion control actuator electronic control units (ECUs) 106, 108, 110, and 112 to share information between each other and/or with one or more other components that may be interconnected to the CAN bus 104 and utilized to control respective actions or functions of the vehicle 102. For example, in one embodiment, the motion control actuator ECUs 108, 110, and 112 may be provided vehicle driving information (e.g., CAN bus messages) for the propulsion motion control actuator ECU 108 to generate acceleration and/or deceleration commands 107, 109 to the vehicle 102, for the braking motion control actuator ECU 110 to generate braking commands 111 to the vehicle 102, and for the steering motion control actuator ECU 112 to generate steering commands 113 to the vehicle 102.

In certain embodiments, prior to being able to perform necessary prototype testing, each of the ECUs 106, 108, 110, and 112 may be subject to passing rigorous and stringent functional safety and regulatory certifications. Thus, in order to streamline the safety and regulatory certifications for each of the motion control actuator ECUs 106, 108, 110, and 112 and increase flexibility with respect to the prototype testing process, a separate safety assurance ECU 114 that may be functionally and regulatorily certified beforehand may also be interconnected to the vehicle CAN bus system 100 and utilized to chaperone and control the motion control actuator ECUs 106, 108, 110, and 112. In certain embodiments, the safety assurance ECU 114 may be interconnected to the CAN bus 104, and may be provided to monitor and chaperone the motion control actuator ECUs 106, 108, 110, and 112 (e.g., which may not be functionally and regulatorily certified), for example, during prototype testing. For example, during prototype testing, the safety assurance ECU 114 may perform functions, such as monitoring for autonomous-driving mode disengagements, monitoring thresholds for vehicle driving parameters (e.g., acceleration, lateral acceleration, velocity, jerk, steering angle, braking, throttle position, torque, and so forth) correspondent to commands being sent from the motion control actuator ECUs 106, 108, 110, and 112, monitoring for system faults that may occur with respect to the motion control actuator ECUs 106, 108, 110, and 112 or one or more other subsystems of the vehicle 102, and so forth. In certain embodiments, as further depicted by FIG. 1, the safety assurance ECU 114 may provide outputs to an autonomy indicator module 116 and receive inputs from a driving-mode mode selector switch 118 that may be utilized to indicate and switch between, for example, when the vehicle 102 is operating in either the autonomous-driving mode or the disengagement-driving mode, respectively. As further depicted, the safety assurance ECU 114 may also include an engagement management submodule 120, a disengagement checker submodule 122, and a safety network submodule 126. In one embodiment, the disengagement checker submodule 122 may receive an analog pedal (e.g., brake, accelerator, clutch) input 124 as indication of whether a supervisory driver has disengaged the vehicle 102 from operating in the autonomous-driving mode to operating in the disengagement-driving mode.

In certain embodiments, as will be further appreciated, in response to detecting a fault or other disturbance deemed as being potentially unsafe, the safety assurance ECU 114 may perform an action to isolate and protect against the fault by, for example, disengaging one or more of the motion control actuator ECUs 106, 108, 110, and 112. For example, as previously noted, because the motion control actuator ECUs may not be functionally and regulatorily certified with respect to necessary functional safety and automotive regulatory certifications, there may be no way for the safety assurance ECU 114 to trust the source of any detected fault, to trust the efficacy of any software-based CAN messages 107, 109, 111, and 113, fault codes, or other commands that may be provided by one or more of the motion control actuator ECUs 106, 108, 110, and 112 (e.g., software-based CAN messages 107, 109, 111, and 113 may possibly be incorrectly computed due to errors elsewhere in the autonomy stack of the vehicle 102), or to trust that any of the motion control actuator ECUs 106, 108, 110, and 112 may be responsive to messages or commands provided by the safety assurance ECU 114. In accordance with the presently disclosed embodiments, to increase overall vehicle 102 safety and prototyping flexibility, it may be useful to provide one or more hardware-based CAN 104 bus fault detection and isolation techniques.

Accordingly, the present embodiments are directed to a safety assurance ECU 114 for monitoring vehicle 102 driving behavior and performing a hardware-based action (e.g., providing a logic signal to trip hardware, electromechanical contacts) to disable communication from one or more of the motion control actuator ECUs 106, 108, 110, and 112 to the CAN bus 104 in response to a detected fault or other disturbance deemed as being potentially unsafe. For example, in certain embodiments, the vehicle 102 may include a safety assurance ECU 114, which may be interconnected in parallel via the CAN bus 104 to the propulsion motion control actuator ECU 108, the braking motion control actuator ECU 110, and the steering motion control actuator ECU 112. In certain embodiments, the safety assurance ECU 114 may constantly monitor vehicle 102 driving behavior based on one or more criteria (e.g., lateral acceleration threshold, velocity threshold, steering angle threshold, acceleration threshold, braking threshold, throttle position threshold, jerk threshold, and so forth) to detect fault conditions (e.g., the vehicle 102 driving behavior was not in accordance with the command or CAN messages 107, 109, 111, and 113 provided by the respective motion control actuator ECUs 106, 108, 110, and 112, or the vehicle 102 is behaving in accordance with faulty command or CAN messages 107, 109, 111, and 113).

In certain embodiments, as will be further appreciated with respect to FIGS. 3, 4A, 4B, and 5, in response to detecting a fault, the safety assurance ECU 114 may generate and provide one or more silencing signals (e.g., logic signals) to trip hardware contacts (e.g., electromechanical contacts, electrohydraulic contacts, piezoelectric contacts, and so forth) utilized to disable communication from one or more of the propulsion motion control actuator ECU 108, the braking motion control actuator ECU 110, and the steering motion control actuator ECU 112 to the CAN bus 104. For example, the one or more silencing signals (e.g., logic signals) may trip one or more hardware contacts (e.g., electromechanical contacts, electrohydraulic contacts, piezoelectric contacts, and so forth), which may disable communication to the CAN bus 104, and, by extension, force the motion control actuator ECUs 106, 108, 110, and 112 to be unable to send commands to the vehicle 102. Specifically, for the braking motion control actuator ECU 110 and the steering motion control actuator ECU 112, the one or more silencing signals (e.g., logic signals) may prevent the braking motion control actuator ECU 110 and/or the steering motion control actuator ECU 112 from being able to send respective CAN messages or commands 111 and 113 through the CAN bus 104. Yet, for the propulsion motion control actuator ECU 108, in particular, the one or more silencing signals (e.g., logic signals) may trip one or more hardware contacts (e.g., electromechanical contacts, electrohydraulic contacts, piezoelectric contacts, and so forth), which may either disable CAN message or command 109 transmission on the CAN bus 104 from the propulsion motion control actuator ECU 108 or cause an accelerator to switch into a disengagement-driving mode via propulsion command 107. Subsequent to the disabling of the CAN messages or commands of the motion control actuator ECUs 106, 108 110, and 112, the safety assurance ECU 114 may relinquish vehicle 102 driving control to a supervisory driver, or otherwise cause the vehicle 102 to perform a hazard state driving maneuver (e.g., perform a gradual braking before coming to a safe stop).

Thus, the present techniques may provide a safety assurance ECU 114 that may be functionally and regulatorily certified that may detect faults based on vehicle 102 driving behavior and respond to the detected faults based entirely on the hardware interconnections of the motion control actuator ECUs 106, 108, 110, and 112 to the CAN bus 104. These techniques may thus increase overall vehicle 102 safety and prototyping flexibility. Indeed, because the safety assurance ECU 114 may ascertain the driving behavior of the vehicle 102 based on one or more vehicle 102 driving parameters (e.g., one or more of vehicle 102 velocity, vehicle 102 steering angle, vehicle 102 acceleration, vehicle 102 lateral acceleration, vehicle 102 jerk, vehicle 102 positioning, vehicle 102 throttle position, vehicle 102 torque, vehicle 102 fuel range, vehicle 102 charge range, vehicle 102 clutch engagement and/or disengagement, vehicle 102 air-to-fuel ratio, vehicle 102 altitude, and so forth), the safety assurance ECU 114 may not rely upon any software-based CAN messages, fault codes, or other commands that may be provided by one or more of the motion control actuator ECUs 106, 108, 110, and 112 (e.g., which may possibly be incorrectly computed due to errors elsewhere in the autonomy stack), or that any of the motion control actuator ECUs 106, 108, 110, and 112 will be responsive to messages or commands provided by the safety assurance ECU 114. This may thus allow the safety assurance ECU 114 to achieve faster response times with respect to detecting, isolating, and protecting against vehicle 102 driving behavior faults. Additionally, the one or more vehicle 102 driving parameters may themselves be less susceptible to misinterpretation, distortion, extended processing times, and overloading as opposed to more complex software-based CAN messages and fault codes.

Indeed, utilizing the presently disclosed hardware-based actions (e.g., providing a logic signal to trip hardware, electromechanical contacts to disable communication from one or more of the motion control actuator ECUs 106, 108 110, and 112 to the CAN bus 104) avoids having to partition any single motion control actuator ECU 106, 108 110, and 112 into several partitions or segmentations, as may otherwise be suitable utilizing software-based CAN messages, fault codes, or other commands. For example, in some instances, one or more of the motion control actuator ECUs 106, 108 110, and 112 may include different levels of memory protection (e.g., segmentation memory protection, paged virtual memory protection, memory protection keys, simulated segmentation memory protection, and so forth), and therefore the hardware-based fault protection techniques as described herein may ensure that the lower integrity partitions or segmentations of memory protection may not adversely impact the memory protection of the higher integrity partitions or segmentations. Moreover, by relying solely upon the safety assurance ECU 114 and the one or more vehicle 102 driving parameters, any possibility of discrepancy between the safety assurance ECU 114 and the one or more other motion control actuator ECUs 106, 108, 110, and 112 may be minimized, in that the safety assurance ECU 114 may take precedence over the motion control actuator ECUs 106, 108, 110, and 112 with respect to vehicle driving behavior faults.

For example, in some embodiments, the motion control actuator ECUs 106, 108, 110, and 112 and the safety assurance ECU 114 may be developed and/or manufactured separately from each other (e.g., different manufacturers, different verification process, different models, and so forth), and thus the present techniques may allow for ECUs otherwise potentially incompatible to be paired together into a safety mechanism for developing vehicles 102. In other words, the safety assurance ECU 114 may compensate for the lack of knowledge of efficacy with respect to the motion control actuator ECUs 106, 108, 110, and 112, thus allowing faster scaling and testing, for example, of an entire fleet of vehicles 102 without any concern that the vehicles 102 may be susceptible to any potential collisions or other precarious events. Indeed, the present embodiments of providing the safety assurance ECU 114 that may be functionally and regulatorily certified that may detect faults based on vehicle 102 driving behavior and respond to the detected faults based entirely on the hardware interconnections of the motion control actuator ECUs 106, 108, 110, and 112 to the CAN bus 104 may compensate for the possibility that the motion control actuator ECUs 106, 108, 110, and 112 may include limited memory resources and/or may include components or software still under development and testing, and thus cannot be reasonably relied upon to operate in accordance with the desired functionality in the event of one or more fault-based conditions. Lastly, by providing the safety assurance ECU 114 that may be functionally and regulatorily certified that may detect faults based on vehicle 102 driving behavior and respond to the detected faults based entirely on the hardware interconnections of the motion control actuator ECUs 106, 108, 110, and 112 to the CAN bus 104 may enhance flexibility with respect to the management and adherence to many functional safety requirements (FSR) through only a single physical element (e.g., the safety assurance ECU 114). Such a configuration may limit physical interface complexities, ensure greater hardware reliability, and distinguish critical safety functions from non-safety critical functions.

Figure 2:
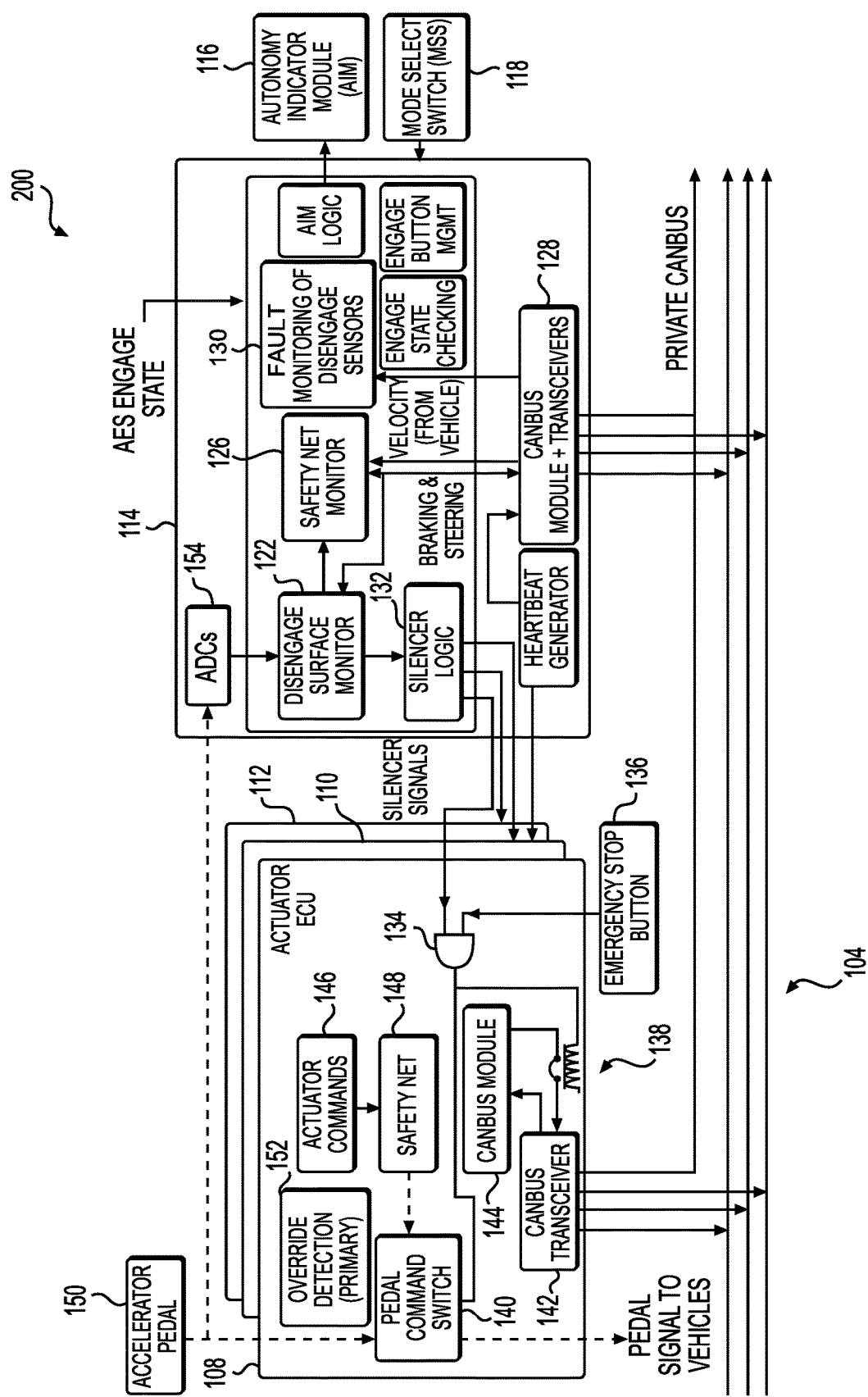
FIG. 2 illustrates a detailed embodiment of a vehicle CAN bus and safety assurance electronic control unit (ECU).

FIG. 2 illustrates a detailed embodiment of a vehicle CAN bus and safety assurance ECU system, in accordance with the presently disclosed embodiments. As generally discussed above with respect to FIG. 1, in certain embodiments, the vehicle CAN bus system 200 may include, for example, a secure communications bus 104 for interconnecting a number of motion control actuator electronic control units ECUs 108, 110, and 112 to share information between each other and/or with one or more other components that may be interconnected to the CAN bus 104 and utilized to control respective actions or functions of the vehicle 102. For example, in one embodiment, the motion control actuator ECUs 108, 110, and 112 may be provided vehicle driving information (e.g., CAN bus messages) for the propulsion motion control actuator ECU 108 to generate acceleration and/or deceleration commands 107, 109 to the vehicle 102, for the braking motion control actuator ECU 110 to generate braking commands 111 to the vehicle 102, and for the steering motion control actuator ECU 112 to generate steering commands 113 to the vehicle 102.

In certain embodiments, as further depicted by FIG. 2, the safety assurance ECU 114 may provide outputs to an autonomy indicator module 116 and receive inputs from a driving-mode mode selector switch 118 that may be utilized to indicate and switch between, for example, when the vehicle 102 is operating in either the autonomous-driving mode or the disengagement-driving mode, respectively. For example, in one embodiment, mode selector switch 118 may allow, for example, a supervisory driver to select between the autonomous-driving mode and the disengagement-driving mode by rotating a physical knob in the vehicle 102. As further depicted, the safety assurance ECU 114 may also include an engagement management submodule 120, a disengagement checker submodule 122, and a safety network submodule 126. In one embodiment, the disengagement checker submodule 122 may receive an analog pedal (e.g., brake, accelerator, clutch) input as indication of whether a supervisory driver has disengaged the vehicle 102 from operating in the autonomous-driving mode to operating in the disengagement-driving mode.

In certain embodiments, as further depicted, the safety assurance ECU 114 may provide CAN messages or commands to the CAN bus 104 via one or more CAN bus transceivers 128. The CAN bus transceivers 128 may also provide vehicle driving data (e.g., one or more of vehicle 102 velocity, vehicle 102 steering angle, vehicle 102 acceleration, vehicle 102 lateral acceleration, vehicle 102 jerk, vehicle 102 positioning, vehicle 102 throttle position, vehicle 102 torque, vehicle 102 fuel range, vehicle 102 charge range, vehicle 102 clutch engagement and/or disengagement, vehicle 102 air-to-fuel ratio, vehicle 102 altitude, and so forth) from the vehicle 102 as the vehicle is operating in the autonomous-driving mode. For example, the vehicle 102 driving data may be provided to the safety network submodule 126 and a fault monitoring submodule 130. In certain embodiments, the fault monitoring submodule 130 may monitor for fault occurrences and cause silencing logic 132 to generate one or more silencing signals (e.g., logic signals) upon detection of a fault (e.g., one or more vehicle 102 driving parameters exceeding a predetermined threshold).

In certain embodiments, in response to detecting a fault or other disturbance deemed as being potentially unsafe, the safety assurance ECU 114 may perform an action to isolate and protect against the fault by, for example, disengaging one or more of the motion control actuator ECUs 108, 110, and 112. For example, the silencing logic 132 of the safety assurance ECU 114 may provide one or more silencing signals (e.g., logic signals) to one or more logic gates 134 (e.g., logical AND gate) of respective motion control actuator ECUs 108, 110, and 112. It should be appreciated that, while certain embodiments may be discussed primarily with respect to an AND logical gate, other embodiments may include any of various logical gates (e.g., OR gate, NOR gate, XOR gate, NAND gate, and/or one or more combinations of logical gates) in accordance with the presently disclosed techniques. In certain embodiments, along with the silencing signals (e.g., logic signals), the one or more logic gates 134 (e.g., logical AND gate) may receive, for example, an input from an emergency stop component 136 (e.g., which may be depressed by a supervisory driver in the event of severe fault).

In certain embodiments, based on the logically high values (e.g., logical value of binary value "1" or 5 volts (s) $V_{DD}$) for the silencing signals (e.g., logic signals) and the emergency stop signal, the one or more logic gates 134 (e.g., logical AND gate) may output a signal to one or more hardware relay contacts 138 and to a pedal command switch 140. In some embodiments, the one or more hardware relay contacts 138 may be useful in decoupling the CAN bus transceivers 142 from the CAN bus 104 in the event of a vehicle 102 driving behavior fault. The CAN bus transceivers 142 may also be used to receive CAN messages or commands from the CAN bus 104 and may store the messages to a CAN bus module 144. In certain embodiments, with respect to the propulsion motion control actuator ECU 108, in particular, the output of the one or more logic gates 134 (e.g., logical AND gate) may be provided to the pedal command switch 140 to disable actuator command module 146 and safety network module 148, and, instead, return control of the vehicle 102 to a supervisory driver to perform a braking via accelerator pedal 150. Lastly, the safety assurance ECU 114 may also include an override detection module 152 that may log the disengagements of the vehicle 102 at, for example, the propulsion motion control actuator ECU 108, as well as log the disengagements of the vehicle 102 at the disengagement checker submodule 122 of the safety assurance ECU 114 after the analog pedal signal is passed through an analog-to-digital converter (ADC) 154.

In this way, and as will be further appreciated below with respect to FIGS. 3, 4A, 4B, and 5, in response to detecting a fault, the safety assurance ECU 114 may generate and provide one or more silencing signals (e.g., logic signals) to trip hardware contacts (e.g., electromechanical contacts, electrohydraulic contacts, piezoelectric contacts, and so forth) utilized to disable communication from one or more of the propulsion motion control actuator ECU 108, the braking motion control actuator ECU 110, and the steering motion control actuator ECU 112 to the CAN bus 104. Thus, the present techniques may provide a safety assurance ECU 114 that may be functionally and regulatorily certified that may detect faults based on vehicle 102 driving behavior and respond to the detected faults based entirely on the hardware interconnections of the motion control actuator ECUs 108, 110, and 112 to the CAN bus 104. These techniques may thus increase overall vehicle 102 safety and prototyping flexibility.

Indeed, because the safety assurance ECU 114 may ascertain the driving behavior of the vehicle 102 based on one or more vehicle 102 driving parameters (e.g., one or more of vehicle 102 velocity, vehicle 102 steering angle, vehicle 102 acceleration, vehicle 102 lateral acceleration, vehicle 102 positioning parameter, vehicle 102 throttle position, vehicle 102 torque, vehicle 102 jerk, vehicle 102 fuel range, vehicle 102 charge range, vehicle 102 clutch engagement and/or disengagement, vehicle 102 air-to-fuel ratio, vehicle 102 altitude, vehicle 102 passenger comfortability, vehicle 102 ride smoothness, and so forth), the safety assurance ECU 114 may not rely upon any software-based CAN messages, fault codes, or other commands that may be provided by one or more of the motion control actuator ECUs 108, 110, and 112 (e.g., which may possibly be incorrectly computed due to errors elsewhere in the autonomy stack), or that any of the motion control actuator ECUs 108, 110, and 112 may be responsive to messages or commands provided by the safety assurance ECU 114. This may thus allow the safety assurance ECU 114 to achieve faster response times with respect to detecting, isolating, and protecting against vehicle 102 driving behavior faults. Additionally, the one or more vehicle 102 driving parameters may themselves be less susceptible to misinterpretation, distortion, extended processing times, and overloading as opposed to more complex software-based CAN messages and fault codes. Moreover, by relying solely upon the safety assurance ECU 114 and the one or more vehicle 102 driving parameters, any possibility of discrepancy between the safety assurance ECU and the one or more other motion control actuator ECUs 108, 110, and 112 may be minimized, in that the safety assurance ECU 114 may take precedence over the motion control actuator ECUs 108, 110, and 112 with respect to vehicle 102 driving behavior faults.

Figure 3:
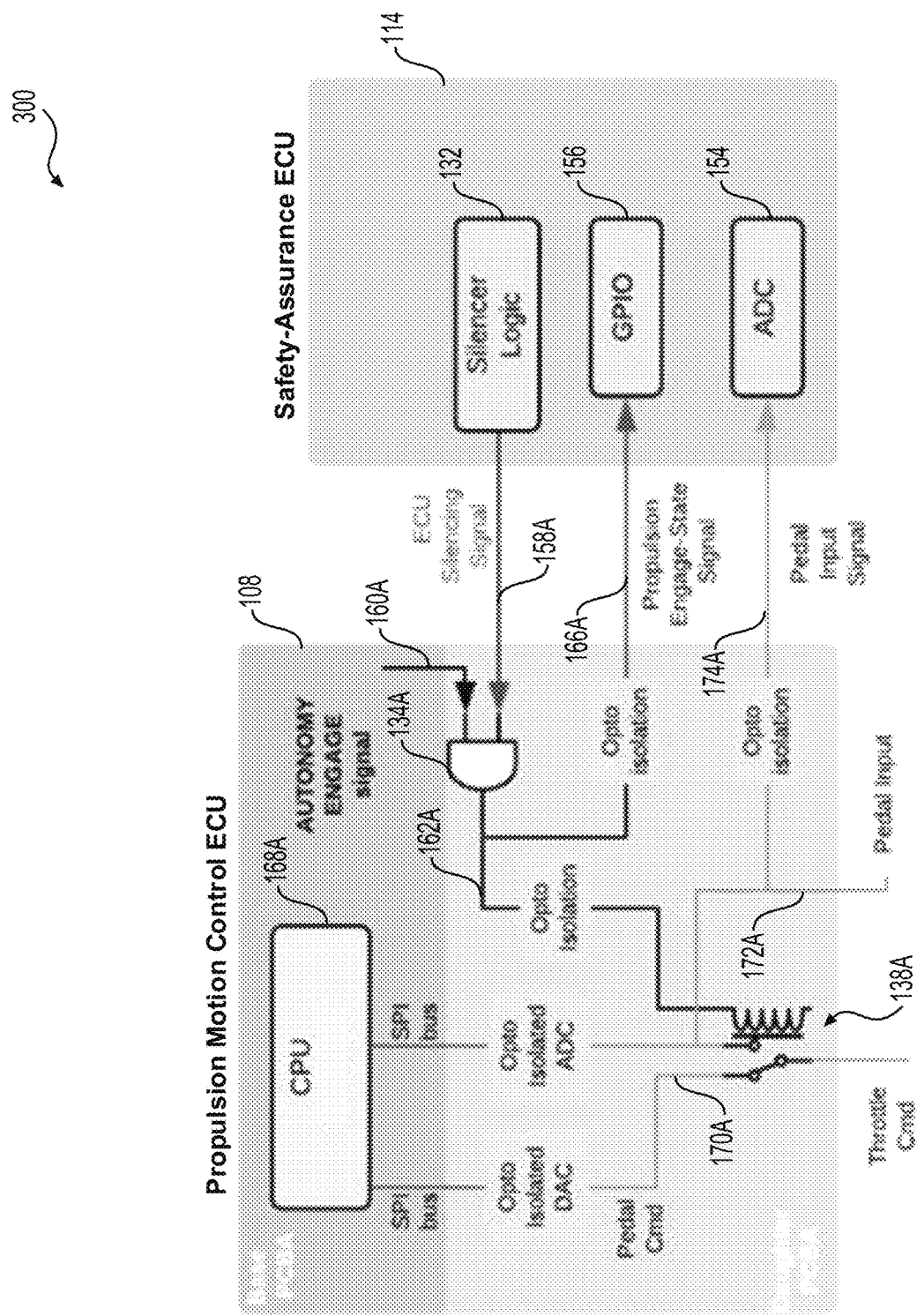
FIG. 3 illustrates an example embodiment of a vehicle CAN bus and safety assurance ECU fault detection and isolation system, including a propulsion motion control actuator ECU.

FIG. 3 illustrates an example embodiment of a vehicle CAN bus and safety assurance ECU fault detection and isolation system 300, including the propulsion motion control actuator ECU 108, in accordance with the presently disclosed embodiments. In certain embodiments, as discussed above with respect to FIG. 2, the safety assurance ECU 114 may detect a vehicle 102 driving behavior fault. For example, in some embodiments, the safety assurance ECU 114 may determine that the vehicle 102 driving behavior was not in accordance with the CAN messages or commands provided by the propulsion motion control actuator ECU 108 (e.g., based on one or more acceleration driving parameter thresholds), or that the vehicle 102 is behaving in accordance with faulty CAN messages or commands. In certain embodiments, in response to detecting a fault or other disturbance deemed as being potentially unsafe, the safety assurance ECU 114 may perform an action to isolate and protect against the fault by, for example, decoupling the propulsion motion control actuator ECU 108 from the CAN bus 104.

In certain embodiments, the safety assurance ECU 114 may include silencing logic 132, ADC 154, and general-purpose input/output (GPIO) module 156. In certain embodiments, as further illustrated by FIG. 3, the silencing logic 132 may provide a silencing signal 158A to a logical gate 134A (e.g., logical AND gate). The logical gate 134A (e.g., logical AND gate) may also receive an autonomous-driving engagement signal 160A, which may indicate that the vehicle 102 may be currently operating in the autonomous-driving mode. In certain embodiments, based on the silencing signal 158A and the autonomous-driving engagement signal 160A each being logically high (e.g., a logical binary value of "1" or 5V $V_{DD}$), the logical gate 134A (e.g., logical AND gate) may generate a logically high output 162A that may be passed to electromechanical relay contacts 138A. Upon the electromechanical relay contacts 138A operating, the central processing unit (CPU) 168A may be decoupled from the throttle command output 170A, and thus the propulsion motion control actuator ECU 108 may be disabled from providing CAN messages or other commands to the CAN bus 104. The logically high output 162A may also be fed back to the GPIO 156 as a propulsion engagement state indication 166A. As further depicted, in some embodiments, upon operating, the electromechanical relay contacts 138A may enable the pedal input 172A to connect to the throttle command output 170A, such that the control of the vehicle 102 may be returned, for example, to a supervisory driver to depress the pedal (e.g., brake, accelerator, clutch) to cause the vehicle 102 to come to a safe stop, for example. The pedal input 172A may also be fed back to the ADC 154 as a pedal input signal indication 174A that the pedal input 172A is engaged.

Figure 4A:
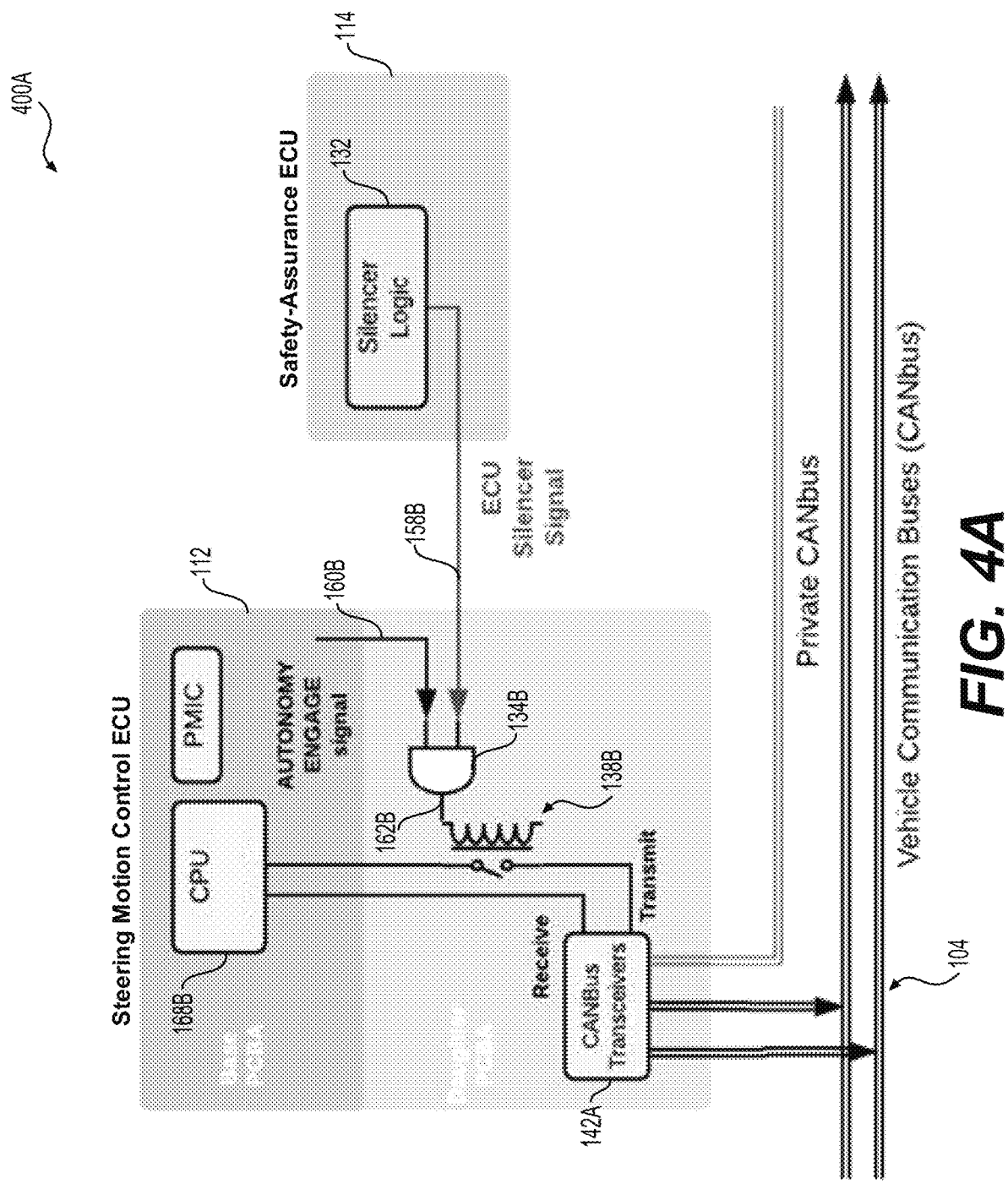
FIG. 4A illustrates an example embodiment of a vehicle CAN bus and safety assurance ECU fault detection and isolation system, including a steering motion control actuator ECU.

FIG. 4A illustrates an example embodiment of a vehicle CAN bus and safety assurance ECU fault detection and isolation system 400A, including the steering motion control actuator ECU 112, in accordance with the presently disclosed embodiments. In certain embodiments, as generally discussed above with respect to FIG. 2, the safety assurance ECU 114 may detect a vehicle 102 driving behavior fault. For example, in some embodiments, the safety assurance ECU 114 may determine that the vehicle 102 driving behavior was not in accordance with the CAN messages or commands provided by the propulsion motion control actuator ECU 108 (e.g., based on one or more steering angle driving parameter thresholds), or that the vehicle 102 is behaving in accordance with faulty CAN messages or commands. In certain embodiments, in response to detecting a fault or other disturbance deemed as being potentially unsafe, the safety assurance ECU 114 may perform an action to isolate and protect against the fault by, for example, decoupling the steering motion control actuator ECU 112 from the CAN bus 104.

In certain embodiments, the safety assurance ECU 114 may include silencing logic 132, which may provide a silencing signal 158B to a logical gate 134B (e.g., logical AND gate). The logical gate 134B (e.g., logical AND gate) may also receive an autonomous-driving engagement signal 160B, which may indicate that the vehicle 102 may be currently operating in the autonomous-driving mode. In certain embodiments, based on the silencing signal 158B and the autonomous-driving engagement signal 160B each being logically high (e.g., a logical binary value of "1" or 5V $V_{DD}$), the logical gate 134B (e.g., logical AND gate) may generate a logically high output 162B that may be passed to electromechanical relay contacts 138B. Upon the electromechanical relay contacts 138B operating, the CPU 168B of the steering motion control actuator ECU 112 may be decoupled from the CAN bus transceivers 142A, and thus the steering motion control actuator ECU 112 may be disabled from providing CAN messages or other commands to the CAN bus 104.

Figure 4B:
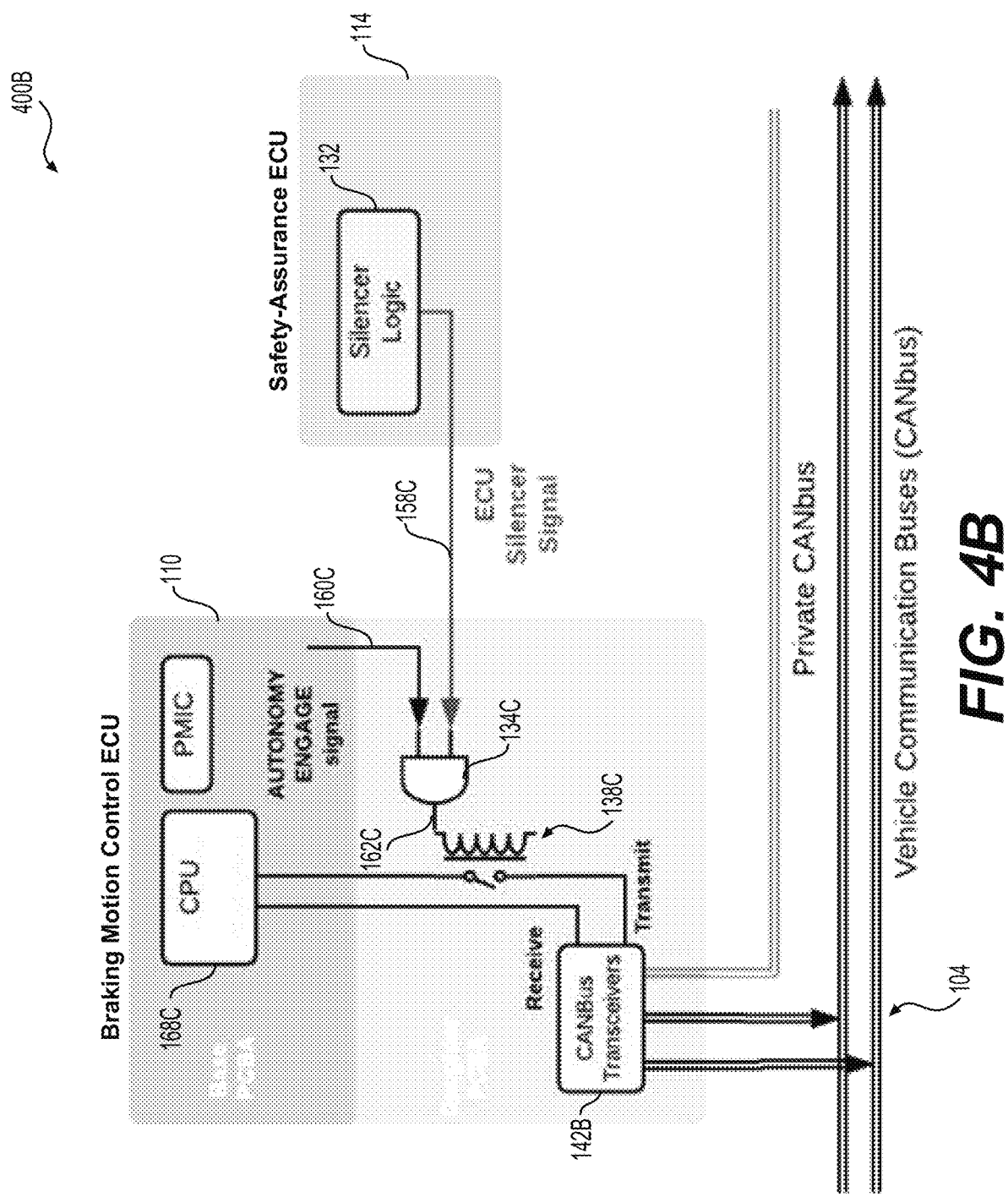
FIG. 4B illustrates an example embodiment of a vehicle CAN bus and safety assurance ECU fault detection and isolation system, including a braking motion control actuator ECU.

FIG. 4B illustrates an example embodiment of a vehicle CAN bus and safety assurance ECU fault detection and isolation system 400B, including the braking motion control actuator ECU 110, in accordance with the presently disclosed embodiments. In certain embodiments, as generally discussed above with respect to FIG. 2, the safety assurance ECU 114 may detect a vehicle 102 driving behavior fault. For example, in some embodiments, the safety assurance ECU 114 may determine that the vehicle 102 driving behavior was not in accordance with the CAN messages or commands provided by the propulsion motion control actuator ECU 108 (e.g., based on one or more braking driving parameter thresholds), or that the vehicle 102 is behaving in accordance with faulty CAN messages or commands. In certain embodiments, in response to detecting a fault or other disturbance deemed as being potentially unsafe, the safety assurance ECU 114 may perform an action to isolate and protect against the fault by, for example, decoupling the braking motion control actuator ECU 110 from the CAN bus 104.

In certain embodiments, the safety assurance ECU 114 may include silencing logic 132, which may provide a silencing signal 158C to a logical gate 134C (e.g., logical AND gate). The logical gate 134C (e.g., logical AND gate) may also receive an autonomous-driving engagement signal 160C, which may indicate that the vehicle 102 may be currently operating in the autonomous-driving mode. In certain embodiments, based on the silencing signal 158C and the autonomous-driving engagement signal 160C each being logically high (e.g., a logical binary value of "1" or 5V $V_{DD}$), the logical gate 134C (e.g., logical AND gate) may generate a logically high output 162C that may be passed to electromechanical relay contacts 138C. Upon the electromechanical relay contacts 138C operating, the CPU 168C of the braking motion control actuator ECU 112 may be decoupled from the CAN bus transceivers 142B, and thus the braking motion control actuator ECU 110 may be disabled from providing CAN messages or other commands to the CAN bus 104.

Figure 5:
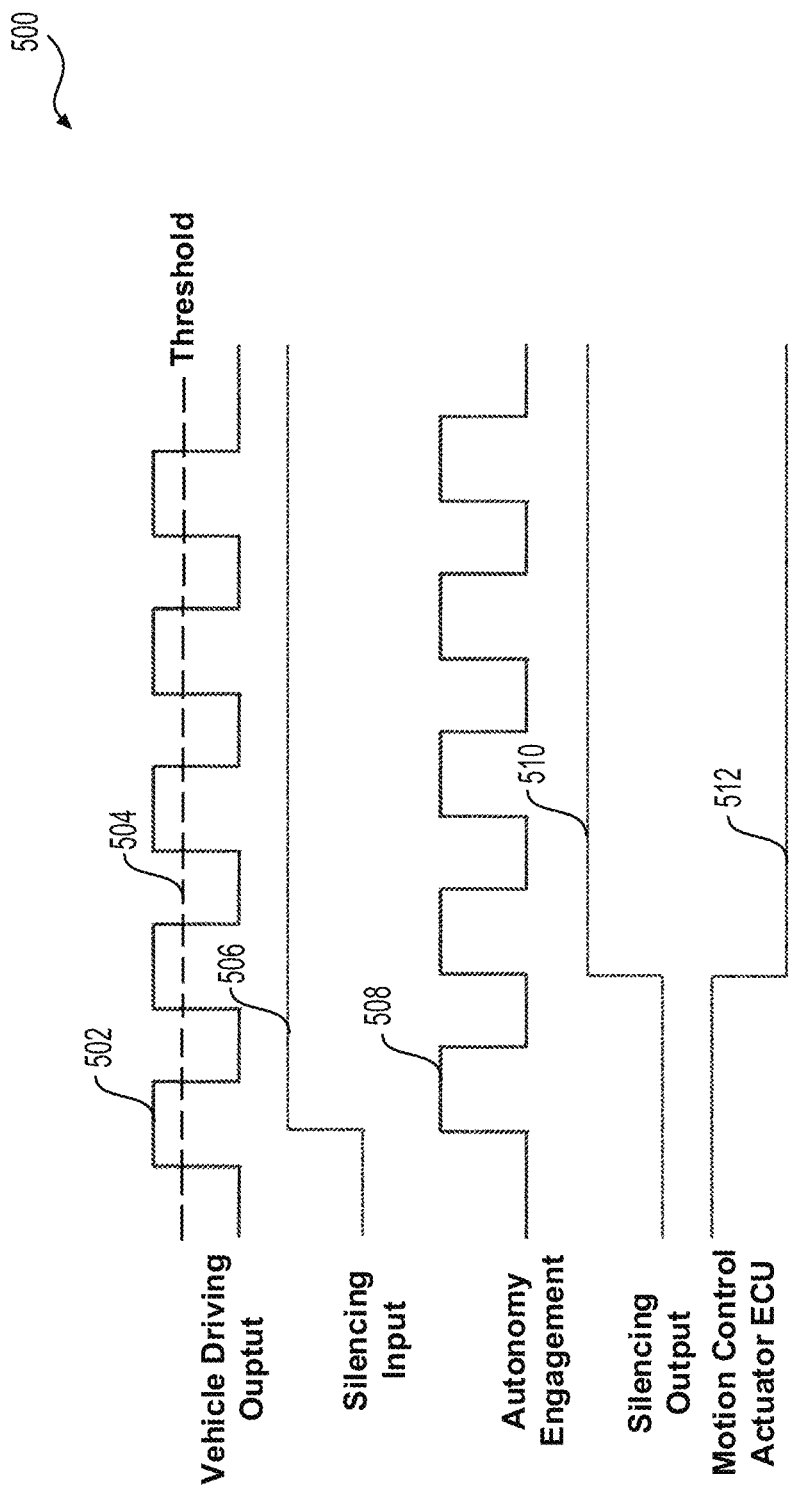
FIG. 5 illustrates an example timing diagram for operating a safety assurance ECU fault detection and isolation system.

FIG. 5 illustrates an example timing diagram 500 for operating a safety assurance ECU fault detection and isolation system, in accordance with the presently disclosed embodiments. In certain embodiments, the safety assurance ECU 114 may detect a vehicle 102 driving behavior fault. For example, in one embodiment, the vehicle driving behavior input may be represented, for example, as a vehicle driving behavior digital signal 502 (e.g., one or more pulse width modulated (PWM) signals). In accordance with the presently disclosed embodiments, the digital signal may correspond to, for example, a braking driving parameter, a steering angle driving parameter, or an acceleration or velocity driving parameter. In certain embodiments, the safety assurance ECU 114 may constantly monitor vehicle driving behavior based on one or more criteria thresholds 504 (e.g., lateral acceleration threshold, acceleration threshold, velocity threshold, steering angle threshold, braking threshold, throttle position threshold, jerk threshold, comfortability threshold, ride smoothness threshold, and so forth).

In certain embodiments, the safety assurance ECU 114 may then provide a silencing input signal 506 to a logical gate 134 (e.g., logical AND gate). As depicted, in one embodiment, the silencing input signal 506 may include a digital signal that may be logically low (e.g., logical binary value of "0" or 0V $V_{DD}$) for a period of time before changing to logically high (e.g., logical binary value of "1" or 5V $V_{DD}$) once the vehicle driving behavior digital signal 502 is determined as exceeding the driving behavior criteria threshold 504. The logical gate 134 (e.g., logical AND gate) may also receive an autonomous-driving engagement signal 508, which may also be represented by a digital signal (e.g., PWM signal). In certain embodiments, at a point in time in which both the silencing input signal 506 and the autonomous-driving engagement signal 508 are logically high (e.g., a logical binary value of "1" or 5V $V_{DD}$), the logical gate 134 (e.g., logical AND gate) may generate a logically high the silencing input signal 510 that may be passed to electromechanical relay contacts 138. Upon the electromechanical relay contacts 138C operating, the one or more motion control actuator ECUs 108, 110, and 112 may be decoupled from the CAN bus transceivers 142, and thus the one or more motion control actuator ECUs 108, 110, and 112 output 512 may change from a logically high (e.g., logical binary value of "1" or 5V $V_{DD}$) to a logically low (e.g., logical binary value of "0" or 0V $V_{DD}$).

Figure 6:
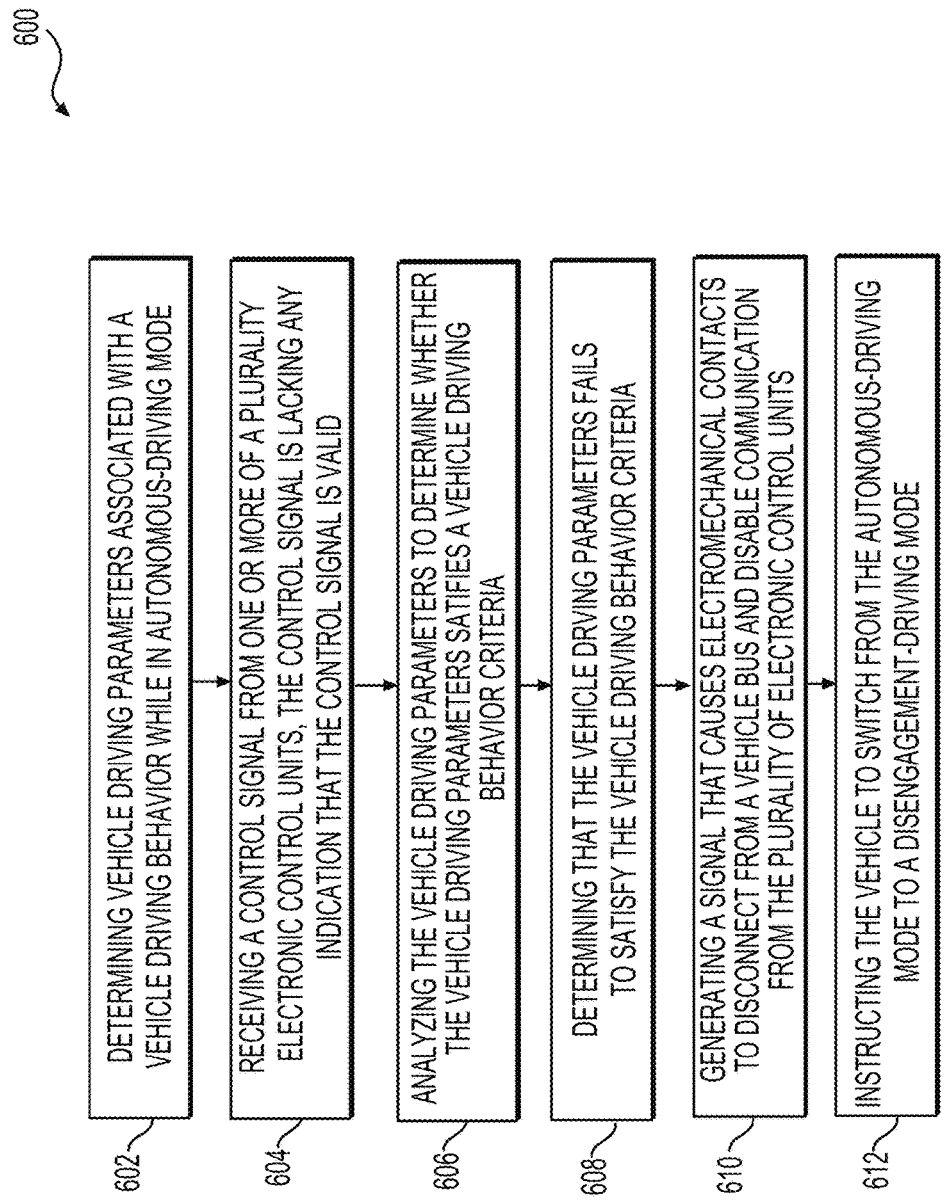
FIG. 6 illustrates a flow diagram of a method for determining vehicle driving behavior and performing a hardware-based action to disable communication from one or more motion control actuator ECUs to a CAN bus in response to a detected fault.

FIG. 6 illustrates a flow diagram of a method 600 for determining vehicle driving behavior and performing a hardware-based action (e.g., providing a logic signal to trip hardware contacts) to disable communication from one or more motion control actuator ECUs to a CAN bus in response to a detected fault, in accordance with the presently disclosed techniques. The method 600 may be performed utilizing one or more processing devices (e.g., safety assurance ECU 114) that may include hardware (e.g., a general purpose processor, a graphic processing unit (GPU), an application-specific integrated circuit (ASIC), a system-on-chip (SoC), a microcontroller, a field-programmable gate array (FPGA), a central processing unit (CPU), an application processor (AP), a visual processing unit (VPU), a neural processing unit (NPU), a neural decision processor (NDP), or any other processing device(s) that may be suitable for processing image data), software (e.g., instructions running/executing on one or more processors), firmware (e.g., microcode), or some combination thereof.

The method 600 may begin at block 602 with one or more processing devices (e.g., safety assurance ECU 114) determining, by a computing unit in serial communication with a plurality of electronic control units of a vehicle, one or more vehicle driving parameters associated with a driving behavior of the vehicle while the vehicle is engaged in an autonomous driving mode, in which each of the plurality of electronic control units is interconnected to a vehicle bus for communicating instructions from one or more electromechanical contacts to one or more actuators of the vehicle to control the driving behavior. The method 600 may then continue at block 604 with the one or more processing devices (e.g., safety assurance ECU 114) receiving, by the computing unit, a control signal from one or more of the plurality of electronic control units, in which the computing unit is lacking an indication of whether the control signal is a valid signal. The method 600 may then continue at block 606 with the one or more processing devices (e.g., safety assurance ECU 114) analyzing, by the computing unit, the one or more vehicle driving parameters associated with the driving behavior to determine whether the one or more vehicle driving parameters satisfies a driving behavior criteria to compensate for the computing unit not knowing whether the control signal is a valid signal. The method 600 may then continue at block 608 with the one or more processing devices (e.g., safety assurance ECU 114) determining, by the computing unit, that the one or more vehicle driving parameters fails to satisfy the driving behavior criteria. The method 600 may continue at block 610 with the one or more processing devices (e.g., safety assurance ECU 114) determining, by the computing unit, that the one or more vehicle driving parameters fails to satisfy the driving behavior criteria. The method 600 may continue at block 612 with the one or more processing devices (e.g., safety assurance ECU 114) generating a signal that causes the electromechanical contacts to disconnect from the vehicle bus and disable communication of instructions between one or more of the plurality of computing units and the vehicle bus. The method 600 may continue at block 614 with the one or more processing devices (e.g., safety assurance ECU 114) instructing, by the computing unit, the vehicle to switch from the autonomous-driving mode to a disengagement-mode.

Accordingly, as described by the method 600 of FIG. 6, the present techniques are directed to a safety assurance ECU for monitoring autonomous or semi-autonomous vehicle driving behavior and performing a hardware-based action (e.g., providing a logic signal to trip hardware contacts) to disable communication from one or more of the motion control actuator ECUs to the CAN bus in response to a detected fault or other disturbance deemed as being potentially unsafe. For example, in certain instances, a vehicle may include a safety assurance ECU, which may be interconnected in parallel via the CAN bus to a propulsion motion control actuator ECU, a steering motion control actuator ECU, and a braking motion control actuator ECU. The safety assurance ECU may constantly monitor vehicle driving behavior based on one or more criteria (e.g., lateral acceleration threshold, acceleration threshold, velocity threshold, steering angle threshold, braking threshold, throttle position threshold, jerk threshold, comfortability threshold, ride smoothness threshold, and so forth) to detect fault conditions (e.g., a vehicle driving behavior was not in accordance with the command or CAN messages provided by the motion control actuator ECUs, or the vehicle is behaving in accordance with faulty commands). In response to detecting a fault, the safety assurance ECU may generate and provide one or more silencing signals (e.g., logic signals) to trip hardware contacts utilized to disable communication from one or more of the propulsion motion control actuator ECU, the steering motion control actuator ECU, and the braking motion control actuator ECU to the CAN bus.

For example, the one or more silencing signals (e.g., logic signals) may trip one or more hardware contacts (e.g., electromechanical contacts, electrohydraulic contacts, piezoelectric contacts, and so forth), which may disable communication to the CAN bus, and, by extension, force the motion control actuator ECUs to be unable to send commands to the vehicle. Specifically, for the braking motion control actuator ECU and the steering motion control actuator ECU, the one or more silencing signals (e.g., logic signals) may prevent the braking motion control actuator ECU and/or the steering motion control actuator ECU from being able to send commands through the CAN bus. Yet, for the propulsion motion control actuator ECU, in particular, the one or more silencing signals (e.g., logic signals) may trip one or more hardware contacts (e.g., electromechanical contacts, electrohydraulic contacts, piezoelectric contacts, and so forth), which may either disable CAN message or command transmission on the CAN bus from the propulsion motion control actuator ECU or cause an accelerator to switch into a disengagement-driving mode. Subsequent to the disabling of the CAN messages or commands of the motion control actuator ECUs, the safety assurance ECU may relinquish vehicle driving control to a supervisory driver, or otherwise cause the vehicle to perform a hazard state driving maneuver (e.g., perform a gradual braking before coming to a safe stop).

Indeed, in certain embodiments, the safety assurance computing unit may be in serial communication with a number of motion control actuator ECUs of a vehicle. In certain embodiments, the safety assurance ECU may determine one or more vehicle driving parameters associated with a driving behavior of the vehicle while the vehicle is engaged in an autonomous driving mode. For example, in one embodiment, each of the motion control actuator ECUs may be interconnected to a CAN vehicle bus for communicating instructions from one or more electromechanical contacts to one or more actuators of the vehicle to control the driving behavior. In certain embodiments, the safety assurance computing unit may receive a control signal from one or more of the motion control actuator ECUs. In one embodiment, the computing unit may lack any indication of whether the control signal is a valid signal. In certain embodiments, the safety assurance computing unit may then analyze the one or more vehicle driving parameters associated with the driving behavior to determine whether the one or more vehicle driving parameters satisfies a driving behavior criteria to compensate for the safety assurance computing unit not knowing whether the control signal is a valid signal.

For example, in certain embodiments, the driving behavior criteria may include, for example, one or more of a predetermined velocity threshold, a predetermined steering angle threshold, a predetermined acceleration threshold, a predetermined lateral acceleration threshold, a predetermined positioning threshold, a predetermined throttle position threshold, a predetermined torque threshold, a predetermined jerk threshold, a predetermined fuel range threshold, a predetermined charge range threshold, a predetermined clutch engagement threshold, or a predetermined air-to-fuel ratio threshold. In certain embodiments, in response to determining that the one or more vehicle driving parameters fails to satisfy the driving behavior criteria, the safety assurance computing unit may then generate a signal that causes the electromechanical contacts to disconnect from the vehicle bus and disable communication of instructions between one or more of the motion control actuator ECUs and the vehicle CAN bus and instruct the vehicle to switch from the autonomous-driving mode to a disengagement-mode. For example, in one embodiment, the safety assurance computing unit may generate the signal that causes the electromechanical contacts to disconnect from the vehicle CAN bus by determining whether the signal and a second signal include logical high values. For example, the second signal may correspond to an indication that the vehicle is operating in the autonomous-driving mode.

For example, in one embodiment, in response to determining that the one or more vehicle driving parameters fails to satisfy the driving behavior criteria, the safety assurance computing unit may generate a silencing signal that causes the electromechanical contacts to disconnect from the vehicle CAN bus and disable communication of instructions between a braking motion control actuator ECU computing unit of the number of motion control actuator ECUs and a transceiver of the braking motion control actuator ECU utilized to enable the communication of instructions to the vehicle CAN bus in the autonomous-driving mode. In another embodiment, in response to determining that the one or more vehicle driving parameters fails to satisfy the driving behavior criteria, the safety assurance computing unit may generate a silencing signal that causes the electromechanical contacts to disconnect from the vehicle CAN bus and disable communication of instructions between a steering motion control actuator ECU of the number of motion control actuator ECUs and a transceiver of the steering motion control actuator ECU utilized to enable the communication of instructions to the vehicle CAN bus in the autonomous-driving mode.

Yet in another embodiment, in response to determining that the one or more vehicle driving parameters fails to satisfy the driving behavior criteria, the safety assurance computing unit may generate a silencing signal that causes the electromechanical contacts to disconnect from the vehicle CAN bus and disable communication of instructions between a propulsion motion control actuator ECU of the number of motion control actuator ECUs and a throttle output channel of the propulsion motion control actuator ECU utilized to enable the communication of instructions to the vehicle CAN bus in the autonomous-driving mode. In other embodiments, generating the silencing signal that causes the electromechanical contacts to disconnect from the vehicle CAN bus may include generating a signal that causes one or more other electromechanical contacts to enable communication of instructions between the propulsion motion control actuator ECU and a manual pedal input channel of the propulsion motion control actuator ECU utilized to enable control of the driving behavior of the vehicle in the disengagement-mode. In this way, the present techniques may provide a safety assurance ECU with functional safety and regulatory certification that may detect faults based on vehicle driving behavior and respond to the detected faults based entirely on the hardware interconnections of motion control actuator ECUs to the CAN bus. These techniques may thus increase overall vehicle safety and prototyping flexibility.

Thus, the present techniques may provide a safety assurance ECU that may be functionally and regulatorily certified that may detect faults based on vehicle driving behavior and respond to the detected faults based entirely on the hardware interconnections of the motion control actuator ECUs to the CAN bus. These techniques may thus increase overall vehicle safety and prototyping flexibility. Indeed, because the safety assurance ECU may ascertain the driving behavior of the vehicle based on one or more vehicle driving parameters (e.g., one or more of vehicle velocity, vehicle steering angle, vehicle acceleration, vehicle lateral acceleration, vehicle positioning parameter, vehicle throttle position, vehicle torque, vehicle jerk, vehicle fuel range, vehicle charge range, vehicle clutch engagement and/or disengagement, vehicle air-to-fuel ratio, vehicle altitude, vehicle passenger comfortability, vehicle ride smoothness, and so forth), the safety assurance ECU may not rely upon any software-based CAN messages, fault codes, or other commands that may be provided by one or more of the motion control actuator ECUs (e.g., which may possibly be incorrectly computed due to errors elsewhere in the autonomy stack), or that any of the motion control actuator ECUs will be responsive to messages or commands provided by the safety assurance ECU. This may thus allow the safety assurance ECU to achieve faster response times with respect to detecting, isolating, and protecting against vehicle driving behavior faults. Additionally, the one or more vehicle driving parameters may themselves be less susceptible to misinterpretation, distortion, extended processing times, and overloading as opposed to more complex software-based CAN messages and fault codes.

Indeed, utilizing the presently disclosed hardware-based actions (e.g., providing a logic signal to trip hardware, electromechanical contacts to disable communication from one or more of the motion control actuator ECUs to the CAN bus) avoids having to partition any single motion control actuator ECU into several partitions or segmentations, as may otherwise be suitable utilizing software-based CAN messages, fault codes, or other commands. For example, in some instances, one or more of the motion control actuator ECUs may include different levels of memory protection (e.g., segmentation memory protection, paged virtual memory protection, memory protection keys, simulated segmentation memory protection, and so forth), and therefore the hardware-based fault protection techniques as described herein may ensure that the lower integrity partitions or segmentations of memory protection may not adversely impact the memory protection of the higher integrity partitions or segmentations. Moreover, by relying solely upon the safety assurance ECU and the one or more vehicle driving parameters, any possibility of discrepancy between the safety assurance ECU and the one or more other motion control actuator ECUs may be minimized, in that the safety assurance ECU may take precedence over the motion control actuator ECUs with respect to vehicle driving behavior faults.

For example, in some embodiments, the motion control actuator ECUs and the safety assurance ECU may be developed and/or manufactured separately from each other (e.g., different manufacturers, different verification process, different models, and so forth), and thus the present techniques may allow for ECUs otherwise potentially incompatible to be paired together into a safety mechanism for developing vehicles. In other words, the safety assurance ECU may compensate for the lack of knowledge of efficacy with respect to the motion control actuator ECUs, thus allowing faster scaling and testing, for example, of an entire fleet of vehicles without any concern that the vehicles may be susceptible to any potential collisions or other precarious events. Indeed, the present embodiments of providing the safety assurance ECU that may be functionally and regulatorily certified that may detect faults based on vehicle driving behavior and respond to the detected faults based entirely on the hardware interconnections of the motion control actuator ECUs to the CAN bus may compensate for the possibility that the motion control actuator ECUs may include limited memory resources and/or may include components or software still under development and testing, and thus cannot be reasonably relied upon to operate in accordance with the desired functionality in the event of one or more fault-based conditions. Lastly, by providing the safety assurance ECU that may be functionally and regulatorily certified that may detect faults based on vehicle driving behavior and respond to the detected faults based entirely on the hardware interconnections of the motion control actuator ECUs to the CAN bus may enhance flexibility with respect to the management and adherence to many functional safety requirements (FSR) through only a single physical element (e.g., the safety assurance ECU). Such a configuration may limit physical interface complexities, ensure greater hardware reliability, and distinguish critical safety functions from non-safety critical functions.

Figure 7:
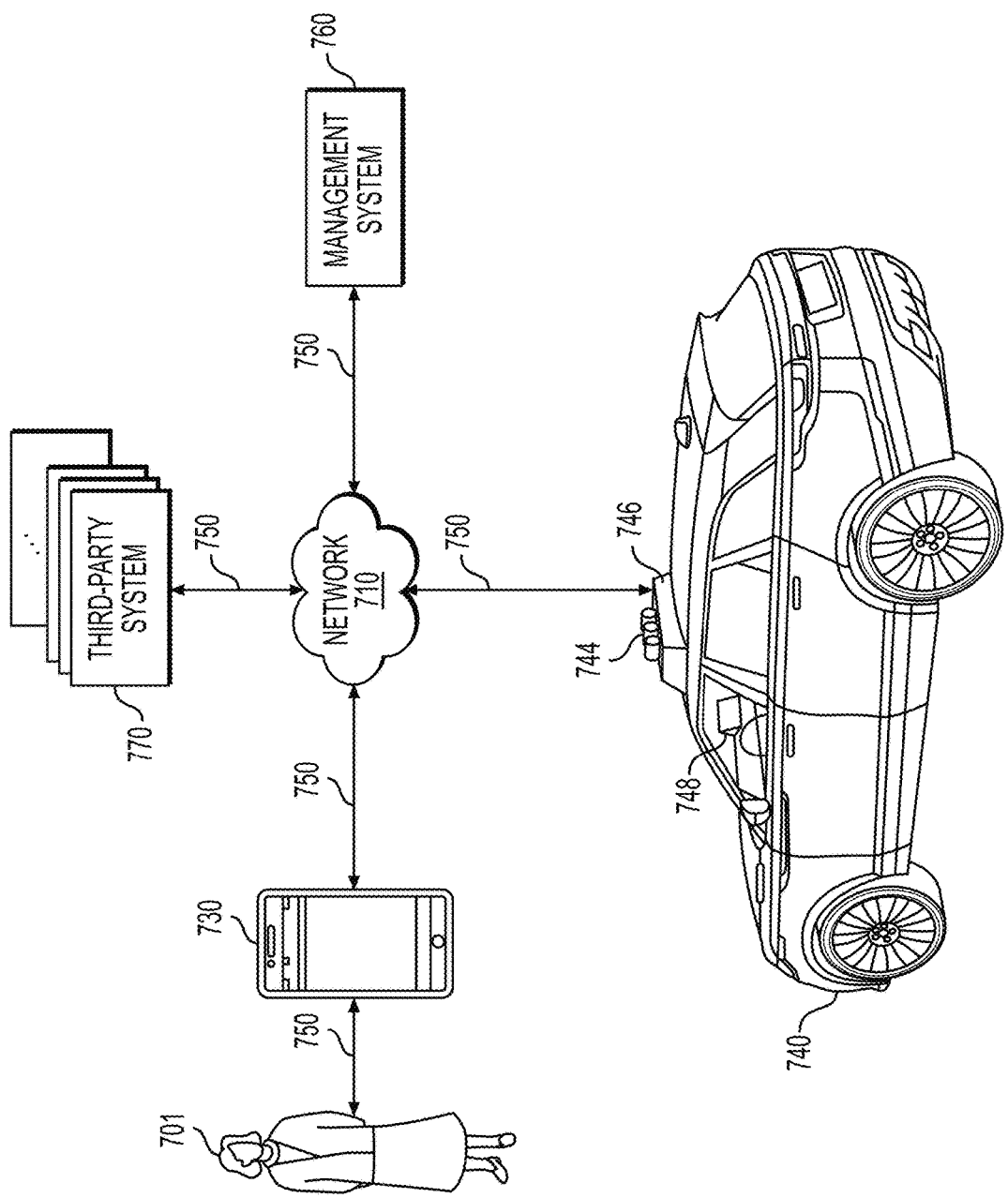
FIG. 7 illustrates an example block diagram of a transportation management environment for testing and validating autonomous or semi-autonomous vehicle driving systems.

FIG. 7 illustrates an example block diagram of a transportation management environment that may be utilized to perform one or more of the forgoing embodiments as discussed herein. In certain embodiments, the environment may include various computing entities, such as a user computing device 730 of a user 701 (e.g., a ride provider or requestor), a transportation management system 760, an autonomous or semi-autonomous vehicle 740, and one or more third-party system 770. The computing entities may be communicatively connected over any suitable network 710. As an example, and not by way of limitation, one or more portions of network 710 may include an ad hoc network, an extranet, a virtual private network (VPN), a local area network (LAN), a wireless LAN (WLAN), a wide area network (WAN), a wireless WAN (WWAN), a metropolitan area network (MAN), a portion of the Internet, a portion of Public Switched Telephone Network (PSTN), a cellular network, or a combination of any of the above. In certain embodiments, any suitable network arrangement and protocol enabling the computing entities to communicate with each other may be used. Although FIG. 7 illustrates a single user device 730, a single transportation management system 760, a single vehicle 740, a plurality of third-party systems 770, and a single network 710, this disclosure contemplates any suitable number of each of these entities. As an example, and not by way of limitation, the network environment may include multiple users 701, user devices 730, transportation management system 760, autonomous or semi-autonomous vehicles 740, third-party systems 770, and networks 710.

The user device 730, transportation management system 760, autonomous or semi-autonomous vehicle 740, and third-party system 770 may be communicatively connected or co-located with each other in whole or in part. These computing entities may communicate via different transmission technologies and network types. For example, the user device 730 and the vehicle 740 may communicate with each other via a cable or short-range wireless communication (e.g., Bluetooth, NFC, WI-FI, etc.), and together they may be connected to the Internet via a cellular network that is accessible to either one of the devices (e.g., the user device 730 may be a smartphone with LTE connection). The transportation management system 760 and third-party system 770, on the other hand, may be connected to the Internet via their respective LAN/WLAN networks and Internet Service Providers (ISP).

FIG. 7 illustrates transmission links 750 that connect user device 730, autonomous or semi-autonomous vehicle 740, transportation management system 760, and third-party system 770 to communication network 710. This disclosure contemplates any suitable transmission links 750, including, e.g., wire connections (e.g., USB, Lightning, Digital Subscriber Line (DSL) or Data Over Cable Service Interface Specification (DOCSIS)), wireless connections (e.g., WI-FI, WiMAX, cellular, satellite, NFC, Bluetooth), optical connections (e.g., Synchronous Optical Networking (SONET), Synchronous Digital Hierarchy (SDH)), any other wireless communication technologies, and any combination thereof. In certain embodiments, one or more links 750 may connect to one or more networks 710, which may include in part, e.g., ad-hoc network, the Intranet, extranet, VPN, LAN, WLAN, WAN, WWAN, MAN, PSTN, a cellular network, a satellite network, or any combination thereof. The computing entities may not necessarily use the same type of transmission link 750. For example, the user device 730 may communicate with the transportation management system via a cellular network and the Internet but communicate with the autonomous vehicle 740 via Bluetooth or a physical wire connection.

In certain embodiments, the transportation management system 760 may fulfill ride requests for one or more users 701 by dispatching suitable vehicles. The transportation management system 760 may receive any number of ride requests from any number of ride users 701 (e.g., ride requestors). In certain embodiments, a ride request from a ride user 701 may include an identifier that identifies the ride requestor in the system 760. The transportation management system 760 may use the identifier to access and store the ride user's 701 information, in accordance with the user's 701 privacy settings. The ride user's 701 information may be stored in one or more data stores (e.g., a relational database system) associated with and accessible to the transportation management system 760. In certain embodiments, ride requestor information may include profile information about a particular ride user 701.

In certain embodiments, the ride user 701 may be associated with one or more categories or types, through which the ride user 701 may be associated with aggregate information about certain ride requestors of those categories or types. Ride information may include, for example, preferred pick-up and drop-off locations, driving preferences (e.g., safety comfort level, preferred speed, rates of acceleration/deceleration, safety distance from other vehicles when traveling at various speeds, route, etc.), entertainment preferences and settings (e.g., preferred music genre or playlist, audio volume, display brightness, etc.), temperature settings, whether conversation with the driver is welcomed, frequent destinations, historical riding patterns (e.g., time of day of travel, starting and ending locations, etc.), preferred language, age, gender, or any other suitable information. In certain embodiments, the transportation management system 760 may classify a user 701 based on known information about the user 701 (e.g., using machine-learning classifiers), and use the classification to retrieve relevant aggregate information associated with that class. For example, the system 760 may classify a user 701 as a young adult and retrieve relevant aggregate information associated with young adults, such as the type of music generally preferred by young adults.

Transportation management system 760 may also store and access ride information. Ride information may include locations related to the ride, traffic data, route options, optimal pick-up or drop-off locations for the ride, or any other suitable information associated with a ride. As an example, and not by way of limitation, when the transportation management system 760 receives a request to travel from San Francisco International Airport (SFO) to Palo Alto, Calif., the system 760 may access or generate any relevant ride information for this particular ride request. The ride information may include, for example, preferred pick-up locations at SFO; alternate pick-up locations in the event that a pick-up location is incompatible with the ride requestor (e.g., the ride requestor may be disabled and cannot access the pick-up location) or the pick-up location is otherwise unavailable due to construction, traffic congestion, changes in pick-up/drop-off rules, or any other reason; one or more routes to navigate from SFO to Palo Alto; preferred off-ramps for a type of user; or any other suitable information associated with the ride.

In certain embodiments, portions of the ride information may be based on historical data associated with historical rides facilitated by the system 760. For example, historical data may include aggregate information generated based on past ride information, which may include any ride information described herein and telemetry data collected by sensors in autonomous vehicles and/or user devices. Historical data may be associated with a particular user (e.g., that particular user's preferences, common routes, etc.), a category/class of users (e.g., based on demographics), and/or all users of the system 760.

For example, historical data specific to a single user may include information about past rides that particular user has taken, including the locations at which the user is picked up and dropped off, music the user likes to listen to, traffic information associated with the rides, time of the day the user most often rides, and any other suitable information specific to the user. As another example, historical data associated with a category/class of users may include, e.g., common or popular ride preferences of users in that category/class, such as teenagers preferring pop music, ride requestors who frequently commute to the financial district may prefer to listen to the news, etc.

As yet another example, historical data associated with all users may include general usage trends, such as traffic and ride patterns. Using historical data, the system 760 in certain embodiments may predict and provide ride suggestions in response to a ride request. In certain embodiments, the system 760 may use machine-learning, such as neural networks, regression algorithms, instance-based algorithms (e.g., k-Nearest Neighbor), decision-tree algorithms, Bayesian algorithms, clustering algorithms, association-rule-learning algorithms, deep-learning algorithms, dimensionality-reduction algorithms, ensemble algorithms, and any other suitable machine-learning algorithms known to persons of ordinary skill in the art. The machine-learning models may be trained using any suitable training algorithm, including supervised learning based on labeled training data, unsupervised learning based on unlabeled training data, and/or semi-supervised learning based on a mixture of labeled and unlabeled training data.

In certain embodiments, transportation management system 760 may include one or more server computers. Each server may be a unitary server or a distributed server spanning multiple computers or multiple datacenters. The servers may be of various types, such as, for example and without limitation, web server, news server, mail server, message server, advertising server, file server, application server, exchange server, database server, proxy server, another server suitable for performing functions or processes described herein, or any combination thereof. In certain embodiments, each server may include hardware, software, or embedded logic components or a combination of two or more such components for carrying out the appropriate functionalities implemented or supported by the server.

In certain embodiments, transportation management system 760 may include one or more data stores. The data stores may be used to store various types of information, such as ride information, ride requestor information, ride provider information, historical information, third-party information, or any other suitable type of information. In certain embodiments, the information stored in the data stores may be organized according to specific data structures. In certain embodiments, each data store may be a relational, columnar, correlation, or any other suitable type of database system. Although this disclosure describes or illustrates particular types of databases, this disclosure contemplates any suitable types of databases. Certain embodiments may provide interfaces that enable a user device 730 (which may belong to a ride requestor or provider), a transportation management system 760, vehicle system 740, or a third-party system 770 to process, transform, manage, retrieve, modify, add, or delete the information stored in the data store.

In certain embodiments, transportation management system 760 may include an authorization server (or any other suitable component(s)) that allows users 701 to opt-in to or opt-out of having their information and actions logged, recorded, or sensed by transportation management system 760 or shared with other systems (e.g., third-party systems 770). In certain embodiments, a user 701 may opt-in or opt-out by setting appropriate privacy settings. A privacy setting of a user may determine what information associated with the user may be logged, how information associated with the user may be logged, when information associated with the user may be logged, who may log information associated with the user, whom information associated with the user may be shared with, and for what purposes information associated with the user may be logged or shared. Authorization servers may be used to enforce one or more privacy settings of the users 701 of transportation management system 760 through blocking, data hashing, anonymization, or other suitable techniques as appropriate.

In certain embodiments, third-party system 770 may be a network-addressable computing system that may provide HD maps or host GPS maps, customer reviews, music or content, weather information, or any other suitable type of information. Third-party system 770 may generate, store, receive, and send relevant data, such as, for example, map data, customer review data from a customer review website, weather data, or any other suitable type of data. Third-party system 770 may be accessed by the other computing entities of the network environment either directly or via network 710. For example, user device 730 may access the third-party system 770 via network 710, or via transportation management system 760. In the latter case, if credentials are to be accessed the third-party system 770, the user 701 may provide such information to the transportation management system 760, which may serve as a proxy for accessing content from the third-party system 770.

In certain embodiments, user device 730 may be a mobile computing device such as a smartphone, tablet computer, or laptop computer. User device 730 may include one or more processors (e.g., CPU and/or GPU), memory, and storage. An operating system and applications may be installed on the user device 730, such as, e.g., a transportation application associated with the transportation management system 760, applications associated with third-party systems 770, and applications associated with the operating system. User device 730 may include functionality for determining its location, direction, or orientation, based on integrated sensors such as GPS, compass, gyroscope, or accelerometer. User device 730 may also include wireless transceivers for wireless communication and may support wireless communication protocols such as Bluetooth, near-field communication (NFC), infrared (IR) communication, WI-FI, and/or 2G/3G/4G/LTE/5G mobile communication standard. User device 730 may also include one or more cameras, scanners, touchscreens, microphones, speakers, and any other suitable input-output devices.

In certain embodiments, the vehicle 740 may be an autonomous or semi-autonomous vehicle and equipped with one or more actuators 742, an array of sensors 744, a navigation system 746, and a ride-service computing device 748. In certain embodiments, a fleet of autonomous or semi-autonomous vehicles 740 may be managed by the transportation management system 760. The fleet of autonomous vehicles 740, in whole or in part, may be owned by the entity associated with the transportation management system 760, or they may be owned by a third-party entity relative to the transportation management system 760. In either case, the transportation management system 760 may control the operations of the autonomous vehicles 740, including, e.g., dispatching select vehicles 740 to fulfill ride requests, instructing the vehicles 740 to perform select operations (e.g., head to a service center or charging/fueling station, pull over, stop immediately, self-diagnose, lock/unlock compartments, change music station, change temperature, and any other suitable operations), and instructing the vehicles 740 to enter select operation modes (e.g., operate normally, drive at a reduced speed, drive under the command of human operators, and any other suitable operational modes) or other mechanical or physical operations that may be caused to be perform via the one or more actuators 742.

In certain embodiments, the autonomous or semi-autonomous vehicles 740 may receive data from and transmit data to the transportation management system 760 and the third-party system 770. Example of received data may include, e.g., instructions, new software or software updates, maps, 3D models, trained or untrained machine-learning models, location information (e.g., location of the ride requestor, the autonomous or semi-autonomous vehicle 740 itself, other vehicles 740, and target destinations such as service centers), navigation information, traffic information, weather information, entertainment content (e.g., music, video, and news) ride requestor information, ride information, and any other suitable information. Examples of data transmitted from the autonomous or semi-autonomous vehicle 740 may include, e.g., telemetry and sensor data, determinations/decisions based on such data, vehicle condition or state (e.g., battery/fuel level, tire and brake conditions, sensor condition, speed, odometer, etc.), location, navigation data, passenger inputs (e.g., through a user interface in the vehicle 740, passengers may send/receive data to the transportation management system 760 and/or third-party system 770), and any other suitable data.

In certain embodiments, autonomous or semi-autonomous vehicles 740 may also communicate with each other as well as other traditional human-driven vehicles, including those managed and not managed by the transportation management system 760. For example, one vehicle 740 may communicate with another vehicle data regarding their respective location, condition, status, sensor reading, and any other suitable information. In certain embodiments, vehicle-to-vehicle communication may take place over direct short-range wireless connection (e.g., WI-FI, Bluetooth, NFC) and/or over a network (e.g., the Internet or via the transportation management system 760 or third-party system 770).

In certain embodiments, an autonomous or semi-autonomous vehicle 740 may obtain and process sensor/telemetry data. Such data may be captured by any suitable sensors. For example, the vehicle 740 may have a LiDAR sensor array of multiple LiDAR transceivers that are configured to rotate 360°, emitting pulsed laser light and measuring the reflected light from objects surrounding vehicle 740. In certain embodiments, LiDAR transmitting signals may be steered by use of a gated light valve, which may be a MEMs device that directs a light beam using the principle of light diffraction. Such a device may not use a gimbaled mirror to steer light beams in 360° around the autonomous or semi-autonomous vehicle. Rather, the gated light valve may direct the light beam into one of several optical fibers, which may be arranged such that the light beam may be directed to many discrete positions around the autonomous or semi-autonomous vehicle. Thus, data may be captured in 360° around the autonomous or semi-autonomous vehicle, but no rotating parts may be necessary. A LiDAR is an effective sensor for measuring distances to targets, and as such may be used to generate a 3D model of the external environment of the autonomous or semi-autonomous vehicle 740. As an example, and not by way of limitation, the 3D model may represent the external environment including objects such as other cars, curbs, debris, objects, and pedestrians up to a maximum range of the sensor arrangement (e.g., 50 meters, 100 meters, or 200 meters).

As another example, the autonomous or semi-autonomous vehicle 740 may have optical cameras pointing in different directions. The cameras may be used for, e.g., recognizing roads, lane markings, street signs, traffic lights, police, other vehicles, and any other visible objects of interest. To enable the vehicle 740 to "see" at night, infrared cameras may be installed. In certain embodiments, the vehicle may be equipped with stereo vision for, e.g., spotting hazards such as pedestrians or tree branches on the road. As another example, the vehicle 740 may have radars for, e.g., detecting other vehicles and/or hazards afar. Furthermore, the vehicle 740 may have ultrasound equipment for, e.g., parking and obstacle detection. In addition to sensors enabling the vehicle 740 to detect, measure, and understand the external world around it, the vehicle 740 may further be equipped with sensors for detecting and self-diagnosing the vehicle's own state and condition. For example, the vehicle 740 may have wheel sensors for, e.g., measuring velocity; global positioning system (GPS) for, e.g., determining the vehicle's current geolocation; and/or inertial measurement units, accelerometers, gyroscopes, and/or odometer systems for movement or motion detection.

As another example, to facilitate communication across the various systems and subsystems that may comprise the autonomous or semi-autonomous vehicle 740, the vehicle 740 may include a controller area network (CAN) bus. The CAN bus may include a secure communications bus for interconnecting a number of motion control actuator electronic control units (ECUs) to share information between each other and/or with one or more other components that may be interconnected to the CAN bus. Specifically, the number of motion control actuator ECUs may be utilized to control one or more respective actions or functions of the vehicle 740 in accordance with the automotive safety regulations and the traffic laws of the jurisdiction in which the vehicle 740 is operating.

As another example, the autonomous or semi-autonomous vehicle 740 may also include a safety assurance ECU for monitoring autonomous or semi-autonomous vehicle 740 driving behavior and performing a hardware-based action (e.g., providing a logic signal to trip hardware contacts) to disable communication from one or more motion control actuator ECUs to the CAN bus in response to a detected fault or other disturbance deemed as being potentially unsafe. For example, in certain instances, a vehicle 740 may include a safety assurance ECU, which may be interconnected in parallel via the CAN bus to a propulsion motion control actuator ECU, a steering motion control actuator ECU, and a braking motion control actuator ECU. The safety assurance ECU may constantly monitor vehicle 740 driving behavior based on one or more criteria (e.g., lateral acceleration threshold, acceleration threshold, velocity threshold, steering angle threshold, braking threshold, throttle position threshold, jerk threshold, comfortability threshold, ride smoothness threshold, and so forth) to detect fault conditions (e.g., a vehicle 740 driving behavior was not in accordance with the command or CAN messages provided by the motion control actuator ECUs, or the vehicle 740 is behaving in accordance with faulty commands). In response to detecting a fault, the safety assurance ECU may generate and provide one or more silencing signals (e.g., logic signals) to trip hardware contacts utilized to disable communication from one or more of the propulsion motion control actuator ECU, the steering motion control actuator ECU, and the braking motion control actuator ECU to the CAN bus.

While the description of these sensors provides particular examples of utility, one of ordinary skill in the art would appreciate that the utilities of the sensors are not limited to those examples. Further, while an example of a utility may be described with respect to a particular type of sensor, it should be appreciated that the utility may be achieved using any combination of sensors. For example, an autonomous vehicle 740 may build a 3D model of its surrounding based on data from its LiDAR, radar, sonar, and cameras, along with a pre-generated map obtained from the transportation management system 760 or the third-party system 770. Although sensors 744 appear in a particular location on autonomous vehicle 740 in FIG. 7, sensors 744 may be located in any suitable location in or on the autonomous or semi-autonomous vehicle 740. Example locations for sensors include the front and rear bumpers, the doors, the front windshield, on the side panel, or any other suitable location.

In certain embodiments, the autonomous vehicle 740 may be equipped with a processing unit (e.g., one or more CPUs and GPUs), memory, and storage. The vehicle 740 may thus be equipped to perform a variety of computational and processing tasks, including processing the sensor data, extracting useful information, and operating accordingly. For example, based on images captured by its cameras and a machine-vision model, the vehicle 740 may identify particular types of objects captured by the images, such as pedestrians, other vehicles, lanes, curbs, and any other objects of interest. In certain embodiments, the autonomous vehicle 740 may have a navigation system 746 responsible for safely navigating the autonomous vehicle 740. In certain embodiments, the navigation system 746 may take as input any type of sensor data from, e.g., a Global Positioning System (GPS) module, inertial measurement unit (IMU), LiDAR sensors, optical cameras, radio frequency (RF) transceivers, or any other suitable telemetry or sensory mechanisms. The navigation system 746 may also utilize, e.g., map data, traffic data, accident reports, weather reports, instructions, target destinations, and any other suitable information to determine navigation routes and particular driving operations (e.g., slowing down, speeding up, stopping, swerving, etc.). In certain embodiments, the navigation system 746 may use its determinations to control the vehicle 740 to operate in prescribed manners and to guide the autonomous vehicle 740 to its destinations without colliding into other objects. Although the physical embodiment of the navigation system 746 (e.g., the processing unit) appears in a particular location on autonomous vehicle 740 in FIG. 7, navigation system 746 may be located in any suitable location in or on autonomous vehicle 740. Example locations for navigation system 746 include inside the cabin or passenger compartment of autonomous vehicle 740, near the engine/battery, near the front seats, rear seats, or in any other suitable location.

In certain embodiments, the autonomous or semi-autonomous vehicle 740 may be equipped with a ride-service computing device 748, which may be a tablet computer, or any other suitable device installed by transportation management system 760 to allow the user to interact with the autonomous vehicle 740, transportation management system 760, other users 701, or third-party systems 770. In certain embodiments, installation of ride-service computing device 748 may be accomplished by placing the ride-service computing device 748 inside autonomous vehicle 740, and further configuring it to communicate with the vehicle 740 via a wire or wireless connection (e.g., via Bluetooth). Although FIG. 7 illustrates a single ride-service computing device 748 at a particular location in autonomous vehicle 740, autonomous or semi-autonomous vehicle 740 may include several ride-service computing devices 748 in several different locations within the vehicle.

As an example, and not by way of limitation, the autonomous or semi-autonomous vehicle 740 may include four ride-service computing devices 748 located in the following places: one in front of the front-left passenger seat (e.g., driver's seat in traditional U.S. automobiles), one in front of the front-right passenger seat, one in front of each of the rear-left and rear-right passenger seats. In certain embodiments, ride-service computing device 748 may be detachable from any component of autonomous vehicle 740. This may allow users to handle ride-service computing device 748 in a manner consistent with other tablet computing devices. As an example, and not by way of limitation, a user may move ride-service computing device 748 to any location in the cabin or passenger compartment of the autonomous or semi-autonomous vehicle 740, may hold ride-service computing device 748, or handle ride-service computing device 748 in any other suitable manner. Although this disclosure describes providing a particular computing device in a particular manner, this disclosure contemplates providing any suitable computing device in any suitable manner.

Figure 8:
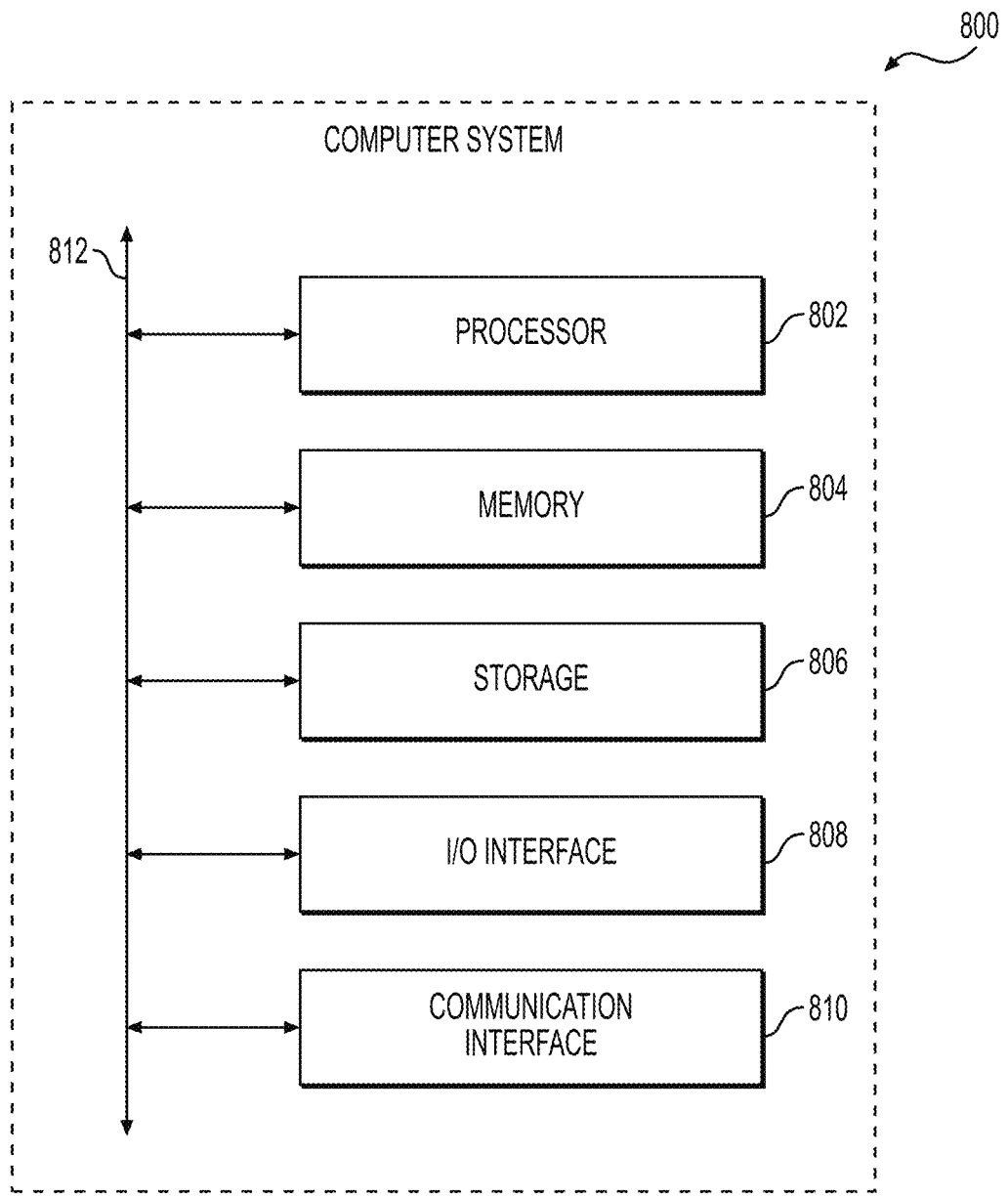
FIG. 8 illustrates an example computer system.

FIG. 8 illustrates an example computer system 800 that may be utilized to perform one or more of the forgoing embodiments as discussed herein. In certain embodiments, one or more computer systems 800 perform one or more steps of one or more methods described or illustrated herein. In certain embodiments, one or more computer systems 800 provide the functionalities described or illustrated herein. In certain embodiments, software running on one or more computer systems 800 performs one or more steps of one or more methods described or illustrated herein or provides the functionalities described or illustrated herein. Certain embodiments include one or more portions of one or more computer systems 800. Herein, a reference to a computer system may encompass a computing device, and vice versa, where appropriate. Moreover, a reference to a computer system may encompass one or more computer systems, where appropriate.

This disclosure contemplates any suitable number of computer systems 800. This disclosure contemplates computer system 800 taking any suitable physical form. As example and not by way of limitation, computer system 800 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, an augmented/virtual reality device, or a combination of two or more of these. Where appropriate, computer system 800 may include one or more computer systems 800; be unitary or distributed; span multiple locations; span multiple machines; span multiple data centers; or reside in a cloud, which may include one or more cloud components in one or more networks. Where appropriate, one or more computer systems 800 may perform without substantial spatial or temporal limitation one or more steps of one or more methods described or illustrated herein. As an example, and not by way of limitation, one or more computer systems 800 may perform in real time or in batch mode one or more steps of one or more methods described or illustrated herein. One or more computer systems 800 may perform at different times or at different locations one or more steps of one or more methods described or illustrated herein, where appropriate.

In certain embodiments, computer system 800 includes a processor 802, memory 804, storage 806, an input/output (I/O) interface 808, a communication interface 810, and a bus 812. Although this disclosure describes and illustrates a particular computer system having a particular number of particular components in a particular arrangement, this disclosure contemplates any suitable computer system having any suitable number of any suitable components in any suitable arrangement. In certain embodiments, processor 802 includes hardware for executing instructions, such as those making up a computer program. As an example, and not by way of limitation, to execute instructions, processor 802 may retrieve (or fetch) the instructions from an internal register, an internal cache, memory 804, or storage 806; decode and execute them; and then write one or more results to an internal register, an internal cache, memory 804, or storage 806. In certain embodiments, processor 802 may include one or more internal caches for data, instructions, or addresses.

This disclosure contemplates processor 802 including any suitable number of any suitable internal caches, where appropriate. As an example, and not by way of limitation, processor 802 may include one or more instruction caches, one or more data caches, and one or more translation lookaside buffers (TLBs). Instructions in the instruction caches may be copies of instructions in memory 804 or storage 806, and the instruction caches may speed up retrieval of those instructions by processor 802. Data in the data caches may be copies of data in memory 804 or storage 806 that are to be operated on by computer instructions; the results of previous instructions executed by processor 802 that are accessible to subsequent instructions or for writing to memory 804 or storage 806; or any other suitable data. The data caches may speed up read or write operations by processor 802. The TLBs may speed up virtual-address translation for processor 802. In certain embodiments, processor 802 may include one or more internal registers for data, instructions, or addresses. This disclosure contemplates processor 802 including any suitable number of any suitable internal registers, where appropriate. Where appropriate, processor 802 may include one or more arithmetic logic units (ALUs), be a multi-core processor, or include one or more processors 802. Although this disclosure describes and illustrates a particular processor, this disclosure contemplates any suitable processor.

In certain embodiments, memory 804 includes main memory for storing instructions for processor 802 to execute or data for processor 802 to operate on. As an example, and not by way of limitation, computer system 800 may load instructions from storage 806 or another source (such as another computer system 800) to memory 804. Processor 802 may then load the instructions from memory 804 to an internal register or internal cache. To execute the instructions, processor 802 may retrieve the instructions from the internal register or internal cache and decode them. During or after execution of the instructions, processor 802 may write one or more results (which may be intermediate or final results) to the internal register or internal cache. Processor 802 may then write one or more of those results to memory 804.

In certain embodiments, processor 802 executes only instructions in one or more internal registers or internal caches or in memory 804 (as opposed to storage 806 or elsewhere) and operates only on data in one or more internal registers or internal caches or in memory 804 (as opposed to storage 806 or elsewhere). One or more memory buses (which may each include an address bus and a data bus) may couple processor 802 to memory 804. Bus 812 may include one or more memory buses, as described in further detail below. In certain embodiments, one or more memory management units (MMUs) reside between processor 802 and memory 804 and facilitate accesses to memory 804 requested by processor 802. In certain embodiments, memory 804 includes random access memory (RAM). This RAM may be volatile memory, where appropriate. Where appropriate, this RAM may be dynamic RAM (DRAM) or static RAM (SRAM). Moreover, where appropriate, this RAM may be single-ported or multi-ported RAM. This disclosure contemplates any suitable RAM. Memory 804 may include one or more memories 704, where appropriate. Although this disclosure describes and illustrates particular memory, this disclosure contemplates any suitable memory.

In certain embodiments, storage 806 includes mass storage for data or instructions. As an example, and not by way of limitation, storage 806 may include a hard disk drive (HDD), a floppy disk drive, flash memory, an optical disc, a magneto-optical disc, magnetic tape, or a Universal Serial Bus (USB) drive or a combination of two or more of these. Storage 806 may include removable or non-removable (or fixed) media, where appropriate. Storage 806 may be internal or external to computer system 800, where appropriate. In certain embodiments, storage 806 is non-volatile, solid-state memory. In certain embodiments, storage 806 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 806 taking any suitable physical form. Storage 806 may include one or more storage control units facilitating communication between processor 802 and storage 806, where appropriate. Where appropriate, storage 806 may include one or more storages 706. Although this disclosure describes and illustrates particular storage, this disclosure contemplates any suitable storage.

In certain embodiments, I/O interface 808 includes hardware, software, or both, providing one or more interfaces for communication between computer system 800 and one or more I/O devices. Computer system 800 may include one or more of these I/O devices, where appropriate. One or more of these I/O devices may enable communication between a person and computer system 800. As an example, and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 808 for them. Where appropriate, I/O interface 808 may include one or more device or software drivers enabling processor 802 to drive one or more of these I/O devices. I/O interface 808 may include one or more I/O interfaces 808, where appropriate. Although this disclosure describes and illustrates a particular I/O interface, this disclosure contemplates any suitable I/O interface.

In certain embodiments, communication interface 810 includes hardware, software, or both providing one or more interfaces for communication (such as, for example, packet-based communication) between computer system 800 and one or more other computer systems 800 or one or more networks. As an example, and not by way of limitation, communication interface 810 may include a network interface controller (NIC) or network adapter for communicating with an Ethernet or any other wire-based network or a wireless NIC (WNIC) or wireless adapter for communicating with a wireless network, such as a WI-FI network. This disclosure contemplates any suitable network and any suitable communication interface 810 for it. As an example, and not by way of limitation, computer system 800 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 800 may communicate with a wireless PAN (WPAN) (such as, for example, a Bluetooth WPAN), a WI-FI network, a WI-MAX network, a cellular telephone network (such as, for example, a Global System for Mobile Communications (GSM) network), or any other suitable wireless network or a combination of two or more of these. Computer system 800 may include any suitable communication interface 810 for any of these networks, where appropriate. Communication interface 810 may include one or more communication interfaces 810, where appropriate. Although this disclosure describes and illustrates a particular communication interface, this disclosure contemplates any suitable communication interface.

In certain embodiments, bus 812 includes hardware, software, or both coupling components of computer system 800 to each other. As an example and not by way of limitation, bus 812 may include an Accelerated Graphics Port (AGP) or any other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 812 may include one or more buses 812, where appropriate. Although this disclosure describes and illustrates a particular bus, this disclosure contemplates any suitable bus or interconnect.

Herein, a computer-readable non-transitory storage medium or media may include one or more semiconductor-based or other types of integrated circuits (ICs) (such as field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative. Additionally, although this disclosure describes or illustrates certain embodiments as providing particular advantages, certain embodiments may provide none, some, or all of these advantages.

The invention claimed is:

1. A method, comprising:
    determining, by a computing unit in serial communication with a plurality of electronic control units of a vehicle, one or more vehicle driving parameters associated with a driving behavior of the vehicle while the vehicle is engaged in an autonomous-driving mode, wherein each of the plurality of electronic control units is interconnected to a vehicle bus for communicating instructions via one or more electromechanical contacts as controlled by one or more actuators of the vehicle to control the driving behavior;
    receiving, by the computing unit, a control signal from one or more of the plurality of electronic control units, wherein the computing unit is lacking knowledge of whether the control signal is valid;
    analyzing, by the computing unit, the one or more vehicle driving parameters associated with the driving behavior to determine whether the one or more vehicle driving parameters satisfies a driving behavior criteria to compensate for the computing unit lacking knowledge of whether the control signal is valid;
    subsequent to determining, by the computing unit, that the one or more vehicle driving parameters fails to satisfy the driving behavior criteria:
        generating a signal that causes the one or more electromechanical contacts to disconnect from the vehicle bus and disable communication of instructions between one or more of the plurality of electronic control units and the vehicle bus; and
        instructing, by the computing unit, the vehicle to switch from the autonomous-driving mode to a disengagement-mode that is a mode indicating when the vehicle is not operating in the autonomous-driving mode.

2. The method of claim 1, further comprising:
    subsequent to determining, by the computing unit, that the one or more vehicle driving parameters fails to satisfy the driving behavior criteria:
        generating a silencing signal that causes the one or more electromechanical contacts to disconnect from the vehicle bus and disable communication of instructions between a braking motion control unit of the plurality of electronic control units and a transceiver of the braking motion control unit utilized to enable the communication of instructions to the vehicle bus in the autonomous-driving mode.

3. The method of claim 1, further comprising:
    subsequent to determining, by the computing unit, that the one or more vehicle driving parameters fails to satisfy the driving behavior criteria:
    generating a silencing signal that causes the one or more electromechanical contacts to disconnect from the vehicle bus and disable communication of instructions between a steering motion control unit of the plurality of electronic control units and a transceiver of the steering motion control unit utilized to enable the communication of instructions to the vehicle bus in the autonomous-driving mode.

4. The method of claim 1, further comprising:
    subsequent to determining, by the computing unit, that the one or more vehicle driving parameters fails to satisfy the driving behavior criteria:

generating a silencing signal that causes the one or more electromechanical contacts to disconnect from the vehicle bus and disable communication of instructions between a propulsion motion control unit of the plurality of electronic control units and a throttle output channel of the propulsion motion control unit utilized to enable the communication of instructions to the vehicle bus in the autonomous-driving mode.

5. The method of claim 4, wherein generating the silencing signal that causes the one or more electromechanical contacts to disconnect from the vehicle bus further comprises generating a signal that causes the one or more electromechanical contacts to enable communication of instructions between the propulsion motion control unit and a manual pedal input channel of the propulsion motion control unit utilized to enable control of the driving behavior of the vehicle in the disengagement-mode.

6. The method of claim 1, wherein generating the signal that causes the one or more electromechanical contacts to disconnect from the vehicle bus further comprises determining whether the signal and a second signal comprise logical high values, wherein the second signal corresponds to an indication that the vehicle is operating in the autonomous-driving mode.

7. The method of claim 1, wherein the computing unit in serial communication with the plurality of electronic control units is functionally and regulatorily certified as contrasted with the plurality of electronic control units, and wherein the computing unit is configured to manage each of the plurality of electronic control units while interconnected to the vehicle bus.

8. A computing unit of a vehicle, comprising:
one or more non-transitory computer-readable storage media including instructions; and
one or more processors coupled to the one or more non-transitory computer-readable storage media, the one or more processors configured to execute the instructions to:
determine, by the computing unit in serial communication with a plurality of electronic control units of a vehicle, one or more vehicle driving parameters associated with a vehicle driving behavior of the vehicle while the vehicle is engaged in an autonomous-driving mode, wherein each of the plurality of electronic control units is interconnected to a vehicle bus for communicating instructions from one or more electromechanical contacts to one or more actuators of the vehicle to control the vehicle driving behavior;
receive, by the computing unit, a control signal from one or more of the plurality of electronic control units, wherein the computing unit is lacking knowledge of whether the control signal is valid;
analyze, by the computing unit, the one or more vehicle driving parameters associated with the vehicle driving behavior to determine whether the one or more vehicle driving parameters satisfies a driving behavior criteria to compensate for the computing unit lacking knowledge of whether the control signal is valid; and
subsequent to determining, by the computing unit, that the one or more vehicle driving parameters fails to satisfy the driving behavior criteria:
generate a signal to that causes the one or more electromechanical contacts to disconnect from the vehicle bus and disable communication of instructions between one or more of the plurality of electronic control units and the vehicle bus; and instruct, by the computing unit, the vehicle to switch from the autonomous-driving mode to a disengagement-mode that is a mode indicating when the vehicle is not operating in the autonomous-driving mode.

9. The computing unit of claim 8, wherein the one or more processors are further configured to execute the instructions to:
subsequent to determining, by the computing unit, that the one or more vehicle driving parameters fails to satisfy the driving behavior criteria:
generate a silencing signal that causes the one or more electromechanical contacts to disconnect from the vehicle bus and disable communication of instructions between a braking motion control unit of the plurality of electronic control units and a transceiver of the braking motion control unit utilized to enable the communication of instructions to the vehicle bus in the autonomous-driving mode.

10. The computing unit of claim 8, wherein the one or more processors are further configured to execute the instructions to:
subsequent to determining, by the computing unit, that the one or more vehicle driving parameters fails to satisfy the driving behavior criteria:
generate a silencing signal that causes the one or more electromechanical contacts to disconnect from the vehicle bus and disable communication of instructions between a steering motion control unit of the plurality of electronic control units and a transceiver of the steering motion control unit utilized to enable the communication of instructions to the vehicle bus in the autonomous-driving mode.

11. The computing unit of claim 8, wherein the one or more processors are further configured to execute the instructions to:
subsequent to determining, by the computing unit, that the one or more vehicle driving parameters fails to satisfy the driving behavior criteria:
generate a silencing signal that causes the one or more electromechanical contacts to disconnect from the vehicle bus and disable communication of instructions between a propulsion motion control unit of the plurality of electronic control units and a throttle output channel of the propulsion motion control unit utilized to enable the communication of instructions to the vehicle bus in the autonomous-driving mode.

12. The computing unit of claim 11, wherein, to generate the silencing signal that causes the one or more electromechanical contacts to disconnect from the vehicle bus, the one or more processors are further configured to generate a signal that causes the one or more electromechanical contacts to enable communication of instructions between the propulsion motion control unit and a manual pedal input channel of the propulsion motion control unit utilized to enable control of the vehicle driving behavior of the vehicle in the disengagement-mode.

13. The computing unit of claim 10, wherein, to generate the signal that causes the one or more electromechanical contacts to disconnect from the vehicle bus, the one or more processors are further configured to determine whether the signal and a second signal comprise logically high values, and wherein the second signal corresponds to an indication that the vehicle is operating in the autonomous-driving mode.

14. The computing unit of claim 10, wherein the computing unit in serial communication with the plurality of electronic control units is functionally and regulatorily certified as contrasted with the plurality of electronic control units, and wherein the computing unit is configured to manage each of the plurality of electronic control units while interconnected to the vehicle bus.

15. A non-transitory computer-readable medium comprising instructions that, when executed by one or more processors of a computing unit, cause the one or more processors to:

determine, by the computing unit in serial communication with a plurality of electronic control units of a vehicle, one or more vehicle driving parameters associated with a vehicle driving behavior of the vehicle while the vehicle is engaged in an autonomous-driving mode, wherein each of the plurality of electronic control units is interconnected to a vehicle bus for communicating instructions from one or more electromechanical contacts to one or more actuators of the vehicle to control the vehicle driving behavior;

receive, by the computing unit, a control signal from one or more of the plurality of electronic control units, wherein the computing unit is lacking knowledge of whether the control signal is valid;

analyze, by the computing unit, the one or more vehicle driving parameters associated with the vehicle driving behavior to determine whether the one or more vehicle driving parameters satisfies a driving behavior criteria to compensate for the computing unit lacking knowledge whether the control signal is valid; and subsequent to determining, by the computing unit, that the one or more vehicle driving parameters fails to satisfy the driving behavior criteria:

generate a signal to that causes the one or more electromechanical contacts to disconnect from the vehicle bus and disable communication of instructions between one or more of the plurality of electronic control units and the vehicle bus; and instruct, by the computing unit, the vehicle to switch from the autonomous-driving mode to a disengagement-mode that is a mode indicating when the vehicle is not operating in the autonomous-driving mode.

16. The non-transitory computer-readable medium of claim 15, wherein the instructions further instructions cause the one or more processors to:

subsequent to determining, by the computing unit, that the one or more vehicle driving parameters fails to satisfy the driving behavior criteria:

generate a silencing signal that causes the one or more electromechanical contacts to disconnect from the vehicle bus and disable communication of instructions between a braking motion control unit of the plurality of electronic control units and a transceiver of the braking motion control unit utilized to enable the communication of instructions to the vehicle bus in the autonomous-driving mode.

17. The non-transitory computer-readable medium of claim 15, wherein the instructions further instructions cause the one or more processors to:

in response to determining, by the computing unit, that the one or more vehicle driving parameters fails to satisfy the driving behavior criteria:

generate a silencing signal that causes the one or more electromechanical contacts to disconnect from the vehicle bus and disable communication of instructions between a steering motion control unit of the plurality of electronic control units and a transceiver of the steering motion control unit utilized to enable the communication of instructions to the vehicle bus in the autonomous-driving mode.

18. The non-transitory computer-readable medium of claim 15, wherein the instructions further instructions cause the one or more processors to:

subsequent to determining, by the computing unit, that the one or more vehicle driving parameters fails to satisfy the driving behavior criteria:

generate a silencing signal that causes the one or more electromechanical contacts to disconnect from the vehicle bus and disable communication of instructions between a propulsion motion control unit of the plurality of electronic control units and a throttle output channel of the propulsion motion control unit utilized to enable the communication of instructions to the vehicle bus in the autonomous-driving mode.

19. The non-transitory computer-readable medium of claim 18, wherein the instructions to generate the silencing signal that causes the one or more electromechanical contacts to disconnect from the vehicle bus further comprise instructions to generate a signal that causes the one or more electromechanical contacts to enable communication of instructions between the propulsion motion control unit and a manual pedal input channel of the propulsion motion control unit utilized to enable control of the vehicle driving behavior of the vehicle in the disengagement-mode.

20. The non-transitory computer-readable medium of claim 15, wherein the instructions to generate the signal that causes the one or more electromechanical contacts to disconnect from the vehicle bus further comprise instructions to determine whether the signal and a second signal comprise logically high values, and wherein the second signal corresponds to an indication that the vehicle is operating in the autonomous-driving mode.

* * * * *